US012241615B1

(12) United States Patent
Béland et al.

(10) Patent No.: US 12,241,615 B1
(45) **Date of Patent: *Mar. 4, 2025**

(54) LUMINAIRE STRUCTURE

(71) Applicant: AXIS LIGHTING INC., Lasalle (CA)

(72) Inventors: Stephane Béland, Lasalle (CA); Howard Yaphe, Lasalle (CA); Andrew Miles, Lasalle (CA); Nicolas Pourrain, Lasalle (CA); Thomas James, Lasalle (CA); Nicola Zarboni, Lasalle (CA); Jennifer Abboud, Lasalle (CA); Hanna Medwid, Lasalle (CA)

(73) Assignee: Axis Lighting Inc., Lasalle (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,691

(22) Filed: Mar. 20, 2023

Related U.S. Application Data

(63) Continuation-in-part of application No. 17/718,167, filed on Apr. 11, 2022, now Pat. No. 11,867,384, and (Continued)

(51) Int. Cl.
*F21V 21/04* (2006.01)
*F21S 8/02* (2006.01)
(Continued)

(52) U.S. Cl.
CPC ............ *F21V 21/045* (2013.01); *F21S 8/026* (2013.01); *F21V 21/048* (2013.01); *F21S 8/043* (2013.01); *F21Y 2103/00* (2013.01)

(58) Field of Classification Search
CPC ...... F21V 21/045; F21V 21/048; F21S 8/026; F21S 8/043
See application file for complete search history.

(56) References Cited

U.S. PATENT DOCUMENTS

| | | |
|---|---|---|
| 4,361,992 A | 12/1982 | Rapp |
| 5,934,786 A | 8/1999 | O'Keefe |

(Continued)

FOREIGN PATENT DOCUMENTS

| | | |
|---|---|---|
| DE | 202018101487 U1 | 4/2018 |
| EP | 3128223 | 2/2017 |

(Continued)

OTHER PUBLICATIONS

FLOS Architectural, "Infra-Structure Evo," accessed on the Internet at: https://arch.flosusa.com/systems/infra-structure-evo/, (believed to be publicly available prior to Mar. 4, 2020).

(Continued)

*Primary Examiner* — Evan P Dzierzynski
(74) *Attorney, Agent, or Firm* — Barnes & Thornburg LLP

(57) ABSTRACT

Disclosed is a grid lighting system having at least one housing segment with at least one lighting zone. At least one lighting module is selected from at least one track lighting module and/or at least one non-track lighting module. The at least one lighting zone extends along a first length dimension of the housing segment and including at least one first passage to receive the at least one track lighting module and/or non-track lighting module. The housing segment includes a first power supply segment to be coupled with a designated line voltage outlet to deliver line voltage power to the at least one lighting module in the at least one lighting zone. Each track lighting module includes a lighting subzone, with a second passage to receive one or more lighting submodules along a second length dimension. A second power supply segment is provided to couple with the first power supply segment to receive line power and to deliver low voltage to the one or more lighting submodules.

28 Claims, 20 Drawing Sheets

Related U.S. Application Data a continuation-in-part of application No. 17/474,373, filed on Sep. 14, 2021, now Pat. No. 11,608,967, said application No. 17/718,167 is a continuation-in-part of application No. 29/804,395, filed on Aug. 19, 2021, now abandoned, said application No. 17/474,373 is a continuation-in-part of application No. 17/391,921, filed on Aug. 2, 2021, now Pat. No. 11,608,969, which is a continuation-in-part of application No. PCT/CA2021/051071, filed on Jul. 29, 2021, application No. 18/186,691 is a continuation-in-part of application No. 17/321,304, filed on May 14, 2021, now Pat. No. 11,635,190, said application No. 17/718,167 is a continuation-in-part of application No. 17/306,855, filed on May 3, 2021, now Pat. No. 11,359,800, said application No. 17/473,373 is a continuation-in-part of application No. 17/162,990, filed on Jan. 29, 2021, now Pat. No. 11,118,765, said application No. 17/306,855 is a continuation-in-part of application No. 17/067,369, filed on Oct. 9, 2020, now Pat. No. 11,181,262, said application No. 17/718,167 is a continuation-in-part of application No. 17/037,361, filed on Sep. 29, 2020, now Pat. No. 11,300,276, said application No. 17/306,855 is a continuation-in-part of application No. 16/899,047, filed on Jun. 11, 2020, now Pat. No. 11,143,814, and a continuation of application No. 16/676,109, filed on Nov. 6, 2019, now Pat. No. 10,995,939, said application No. 17/321,304 is a continuation-in-part of application No. 16/004,057, filed on Jun. 8, 2018, now Pat. No. 11,199,002, said application No. 16/676,109 is a continuation of application No. 15/909,457, filed on Mar. 1, 2018, now Pat. No. 10,473,307, said application No. 16/004,057 is a continuation-in-part of application No. 29/615,179, filed on Aug. 26, 2017, now Pat. No. Des. 926,346, and a continuation-in-part of application No. 29/610,783, filed on Jul. 14, 2017, now Pat. No. Des. 875,988.

(60) Provisional application No. 62/991,535, filed on Mar. 18, 2020, provisional application No. 62/985,205, filed on Mar. 4, 2020, provisional application No. 62/859,922, filed on Jun. 11, 2019, provisional application No. 62/532,977, filed on Jul. 14, 2017, provisional application No. 62/532,970, filed on Jul. 14, 2017, provisional application No. 62/521,795, filed on Jun. 19, 2017.

(51) Int. Cl.

| | |
|---|---|
| *F21S 8/04* | (2006.01) |
| *F21Y 103/00* | (2016.01) |

(56) References Cited

U.S. PATENT DOCUMENTS

| | | | | |
|---|---|---|---|---|
| 6,761,342 | B1 | 7/2004 | Giefer | |
| 7,503,536 | B2 | 3/2009 | Friederich | |
| 8,240,875 | B2 | 8/2012 | Roberts | |
| 8,282,259 | B2 | 10/2012 | Itaya | |
| 9,534,771 | B2 | 1/2017 | Wu et al. | |
| 9,677,746 | B2 | 6/2017 | Ramirez | |
| 9,945,543 | B2 | 4/2018 | Ramirez | |
| 9,989,228 | B2 | 6/2018 | Tuchler | |
| 10,344,476 | B2 | 7/2019 | Sorensen et al. | |
| 10,352,513 | B2 | 7/2019 | Sonneman | |
| 10,443,823 | B2 | 10/2019 | Beland et al. | |
| 10,443,827 | B2 | 10/2019 | Lax | |
| 10,585,229 | B1 | 3/2020 | Lax | |
| 10,788,191 | B1 | 9/2020 | Berry | |
| RE48,264 | E | 10/2020 | Ramirez | |
| 10,794,580 | B1 | 10/2020 | Su | |
| 10,845,043 | B2 | 11/2020 | Tuchler | |
| 10,889,987 | B2 | 1/2021 | Patterson | |
| 11,092,319 | B2 * | 8/2021 | Béland | F21V 21/14 |
| 11,131,446 | B2 | 9/2021 | Beland et al. | |
| 11,162,655 | B2 | 11/2021 | Medendorp, Jr. et al. | |
| 2008/0190043 | A1 * | 8/2008 | Beckmann | E04B 2/74 52/64 |
| 2010/0321929 | A1 | 12/2010 | Ramirez et al. | |
| 2011/0122603 | A1 | 5/2011 | Shamshoian | |
| 2012/0063143 | A1 | 3/2012 | Park | |
| 2014/0226316 | A1 | 8/2014 | Medendorp, Jr. et al. | |
| 2015/0198311 | A1 * | 7/2015 | O'Brien | F21S 8/066 362/220 |
| 2015/0219825 | A1 | 8/2015 | Wu | |
| 2015/0267910 | A1 | 9/2015 | Lazalier | |
| 2015/0316238 | A1 * | 11/2015 | Guilmette | F21V 7/24 362/217.05 |
| 2015/0362155 | A1 | 12/2015 | Thomsen | |
| 2017/0082253 | A1 | 3/2017 | Sorensen et al. | |
| 2017/0184290 | A1 | 6/2017 | Chiu | |
| 2017/0292661 | A1 * | 10/2017 | Moioli | F21V 15/01 |
| 2018/0249560 | A1 | 8/2018 | Ando | |
| 2018/0251978 | A1 | 9/2018 | Yaphe | |
| 2018/0313503 | A1 * | 11/2018 | Sonneman | F21V 23/06 |
| 2019/0162392 | A1 | 5/2019 | Guerra | |
| 2019/0170341 | A1 | 6/2019 | Lax | |
| 2019/0285265 | A1 | 9/2019 | Lee | |
| 2020/0217488 | A1 | 7/2020 | Beland et al. | |
| 2020/0263861 | A1 | 8/2020 | Carney | |
| 2020/0284420 | A1 | 9/2020 | Cordero | |
| 2020/0340642 | A1 | 10/2020 | Patterson | |
| 2020/0386396 | A1 | 12/2020 | Wolfe | |
| 2020/0393099 | A1 | 12/2020 | Yaphe et al. | |

FOREIGN PATENT DOCUMENTS

| | | |
|---|---|---|
| EP | 3543605 | 9/2019 |
| EP | 3882513 | 9/2021 |
| EP | 3883351 | 9/2021 |
| EP | 4148321 | 3/2023 |
| KR | 102126517 | 6/2020 |

OTHER PUBLICATIONS

Focal Point, "Seem 1 Acoustic Trio, LED Direct/Indirect," Brochure accessed on-line at: https://www.focalpointlights.com/products/acoustics-pendant-suspended-linear/seem-1-acoustic-trio-unlit-ausm1tp, (Feb. 2021).

Focal Point, "Seem 1 LED Direct," Brochure accessed on-line at: https://www.focalpointlights.com/products/suspended-linear/seem-1-fsm1s, (May 2021).

Lumenalpha™ spot, 209272, Lumenpulse Global Tek 100 track system installation instructions (2016).

Lytespan Track lighting 9100 (1999).

Philips, Lytespan, Basic, 1 Circuit Track 6000 (2015).

Search Report & Written Opinion issued in Int'l Appl. No. PCT/CA2021/051071 (2021).

WAC Lighting, J Series 2 Circuit Track (2012).

XAL USA, "Move It System," accessed on the Internet at: https://www.xalusa.com/move-it-system, (believed to be publicly available prior to Mar. 4, 2020).

Zumtobel, "ZX2 continuous-row lighting system," accessed on the Internet at: https://www.zumtobel.com/com-en/products/zx2.html, (believed to be publicly available prior to Mar. 4, 2020).

* cited by examiner

LUMINAIRE STRUCTURE

CROSS REFERENCE TO RELATED APPLICATIONS

This application is a Continuation-in-Part of co-pending U.S. patent application Ser. No. 17/474,373, filed Sep. 14, 2021, which is a Continuation-in-Part of U.S. patent application Ser. No. 17/162,990, filed Jan. 29, 2021 (now U.S. Pat. No. 11,118,765), which claims the benefit of priority under 35 U.S.C. § 119 (c) to U.S. Provisional Patent Application No. 62/985,205, filed Mar. 4, 2020; this application is also a Continuation-in-Part of co-pending U.S. patent application Ser. No. 17/391,921, filed Aug. 2, 2021 (now U.S. Pat. No. 11,608,969), which is a Continuation-in-Part of International Patent Application No. PCT/CA2021/051071, filed Jul. 29, 2021. U.S. patent application Ser. No. 17/391,921, filed Aug. 2, 2021, is also a Continuation-in-Part of U.S. patent application Ser. No. 17/162,990, filed Jan. 29, 2021, which claims the benefit of priority under 35 U.S.C. § 119 (c) to U.S. Provisional Patent Application No. 62/985,205, filed Mar. 4, 2020, and is a Continuation-in-Part of PCT Patent Application No. PCT/CA2021/051071, filed Jul. 29, 2021.

This application is also a Continuation-in-Part of copending U.S. patent application Ser. No. 17/718,167, filed Apr. 11, 2022, which is a Continuation-in-Part of U.S. application Ser. No. 17/306,855, filed May 3, 2021, which is a Continuation of U.S. application Ser. No. 16/676,109, filed Nov. 6, 2019 (now U.S. Pat. No. 10,995,939), which is a Continuation of U.S. application Ser. No. 15/909,457, filed Mar. 1, 2018 (Now U.S. Pat. No. 10,473,307), which claims the benefit of priority under 35 U.S.C. § 119 (c) to U.S. Provisional Patent Application No. 62/521,795, filed Jun. 19, 2017, and U.S. Provisional Patent Application No. 62/532,970, filed Jul. 14, 2017; U.S. application Ser. No. 17/306,855 is also a Continuation-in-Part of co-pending U.S. application Ser. No. 16/899,047, filed Jun. 11, 2020, which claims the benefit of priority under 35 U.S.C. § 119 (c) to U.S. Provisional Patent Application No. 62/859,922, filed Jun. 11, 2019, and to U.S. Provisional Patent Application No. 62/991,535, filed Mar. 18, 2020; U.S. application Ser. No. 17/306,855 is also a Continuation-in-Part of U.S. application Ser. No. 17/067,369, filed Oct. 9, 2020, which claims the benefit of priority under 35 U.S.C. § 119 (c) to U.S. Provisional Patent Application No. 62/991,535, filed Mar. 18, 2020; U.S. application Ser. No. 17/718,167 is also a Continuation-in-Part of copending U.S. application Ser. No. 17/037,361, filed Sep. 29, 2020 (now U.S. Pat. No. 11,300,276), and a Continuation-in-Part of U.S. Design application Ser. No. 29/804,395, filed Aug. 19, 2021.

This application is also a Continuation-in-Part of copending U.S. patent application Ser. No. 17/321,304, filed May 14, 2021, which is a Continuation-in-Part of U.S. patent application Ser. No. 16/004,057, filed Jun. 8, 2018 (now U.S. Pat. No. 11,199,002), which claims the benefit of priority under 35 U.S.C. § 119 (e) to U.S. Provisional Patent Application No. 62/532,977, filed Jul. 14, 2017. U.S. application Ser. No. 16/004,057 is also a Continuation-in-Part of U.S. Design application Ser. No. 29/610,783, filed Jul. 14, 2017 (now Pat. No. D875,988) and is a Continuation-in-Part of U.S. Design application Ser. No. 29/615,179, filed Aug. 26, 2017. The disclosures set forth in the following applications are incorporated herein by reference in their entireties.

Additionally, the disclosures set forth in the following applications are incorporated herein by reference in their entireties:

U.S. patent application Ser. No. 16/795,153, filed Feb. 19, 2020 and entitled COUPLERS FOR LIGHT FIXTURES;

U.S. patent application Ser. No. 15/299,168, filed Oct. 20, 2016 and entitled COUPLERS FOR LIGHT FIXTURES, now granted as U.S. Pat. No. 10,215,380;

U.S. patent application Ser. No. 16/256,356, filed Jan. 24, 2019 and entitled COUPLERS FOR LIGHT FIXTURES, now granted as U.S. Pat. No. 10,584,857;

U.S. Pat. App. No. 62/820,083 filed Mar. 18, 2019 and entitled MOUNT INTERFACE FOR LIGHT FIXTURES; and U.S. patent application Ser. No. 16/723,665 filed Dec. 20, 2019 and entitled MOUNT INTERFACE FOR LIGHT FIXTURES.

FIELD OF THE DISCLOSURE

The present disclosure relates to luminaire structures and associated structures.

BACKGROUND

Traditionally, grid lighting systems deploy a grid of track segments which are configured to deliver power to a collection of lighting modules, to deliver lighting to a space.

Considerable effort is involved in the installation of such grid lighting systems so that, once installed, the actual configuration of lighting modules can safely be changed by a user. This is done by delivering "low voltage", such as that specified as Class 2 UL, along the entire grid lighting system, to be coupled with "low voltage" lighting modules.

In such configurations, each of the track segments is usually supplied with an array of dedicated "low voltage" supply "line drops" appearing at relatively short intervals, such as at every 8 feet, along the grid lighting system. Moreover, each "low voltage" supply line is usually supplied by a "remote" power supply, which may power one or several of such "low voltage" supply lines. This usually requires a dedicated utility space, remote from the grid lighting system itself, to be set aside to locate the power supplies, along with considerable lengths of power cabling to and from each power supply to its one or several designated "low voltage" line drops. Thus, the larger the area occupied by the grid lighting system, the larger the power supply infrastructure required to allow it to function in the manner intended, with a corresponding increasing overhead expense as a result.

It would thus be desirable to provide novel approaches for grid lighting systems, or at least to provide the public with one or more useful alternatives.

SUMMARY

In an aspect, there is provided a grid lighting system, comprising: at least one housing segment with at least one lighting zone. At least one lighting module is selected from at least one track lighting module and/or at least one non-track lighting module. The at least one lighting zone extends along a first length dimension of the housing segment and including at least one first passage to receive the at least one track lighting module and/or non-track lighting module therein. The housing segment includes a first power supply segment to be coupled with a designated line voltage outlet to deliver line voltage power to the at least one lighting module in the at least one lighting zone. Each track lighting module includes a lighting subzone, with a second passage therein to receive one or more lighting submodules along a second length dimension, and a second power supply segment to couple with the first power supply segment to receive line voltage power therefrom and to deliver low voltage power to the one or more lighting submodules.

Some example embodiments may further comprise at least one hub segment to join with the at least one housing segment to form a grid configuration.

In some example embodiments, the first power supply segment may include one or more line voltage outlet plugs spaced along the first length dimension.

In some example embodiments, a group of one or more of the line voltage outlet plugs may be each mounted on a corresponding cable to engage a matching line voltage inlet plug in the corresponding lighting module.

In some example embodiments, each of the one or more lighting submodules may include a class 2 driver, or other driver, and the second power supply segment is configured to deliver substantially constant voltage thereto.

In some example embodiments, each non-track lighting module may include a constant current driver.

In some example embodiments, the at least one lighting zone may include a direct lighting zone and/or an indirect lighting zone.

In some example embodiments, the at least one lighting module may include a plurality of lighting modules, which may include a direct group of one or more lighting modules and/or an indirect group of one or more lighting modules. Each lighting module may include a sub-structure which may be configured to fit exclusively in a corresponding direct passage in the direct lighting zone or an indirect passage in the indirect lighting zone.

In some example embodiments, each lighting module in the direct group may have at least one dimension and/or formation which may differ from a corresponding at least one dimension and/or formation of each lighting module in the indirect group.

In some example embodiments, the first power supply segment may be configured to receive the line voltage power at a voltage of from about 120 volts to about 277 volts at 60 watts.

In some example embodiments, the second power supply segment may be configured to deliver the low voltage at a voltage of about 12 to about 48 volts at 60 watts.

In some example embodiments, the first length dimension may be substantially in line and/or coplanar with the second length dimension.

In an aspect, there is provided a grid lighting system, comprising: at least one elongate support structure defining at least one lighting zone, and at least one lighting module selected from at least one track lighting module and/or at least one non-track lighting module. The at least one lighting zone is configured to extend along a length dimension of the elongate support structure and to receive the at least one lighting module. The elongate support structure is associated with a first power supply segment to deliver line voltage power to the at least one lighting module in the at least one lighting zone. Each track lighting module includes a lighting subzone extending along a length dimension thereof, to receive one or more lighting submodules therein, and a second power supply segment to couple with the first power supply segment to deliver low voltage power to the at least one lighting submodule in the lighting subzone. The first power supply segment is configured in a first mode to deliver line voltage power to the at least one lighting module, and in a second mode to cooperate with the second power supply segment in the at least one track lighting module to deliver low voltage power to the at least one lighting submodule.

In an aspect, there is provided a kit for assembling a grid lighting network, comprising: a plurality of grid segments configured to be assembled to form a grid network defining a plurality of mounting sectors for supporting each of a plurality of lighting modules. At least one first power supply segment is to be coupled to a line voltage outlet to deliver line voltage power to each mounting sector in at least one power delivery zone in the grid network and which is defined by: a designated number of the plurality of mounting sectors; and a designated number of the plurality of lighting modules, each configured for mounting in the at least one power delivery zone at one of the designated number of mounting sectors. The at least one power delivery zone is configured according to a combined lighting unit power rating for the power delivery zone to approach but not exceed a maximum power delivery rating of the line voltage outlet, to enable any one of the designated number of lighting modules to be moved from one of the mounting sectors to another in the designated number thereof, and still comply with the maximum power delivery rating of the line voltage outlet. The designated number of lighting modules is selected from one or more track lighting modules and/or one or more non-track lighting modules.

In another aspect, there is provided a method for preparing a configured installation of a grid lighting network in a target space, comprising:

- providing a plurality of grid segments configured to be assembled into the grid lighting network for supporting each of a plurality of interchangeable lighting modules at a corresponding one of a plurality of mounting sectors defined thereon,
- allocating the plurality of grid segments to a first power delivery zone defined by:
  - i. a designated number of mounting sectors along the first power delivery zone; and
  - ii. a designated number of the interchangeable lighting modules, each for mounting at any one of the designated number of mounting sectors in the first power delivery zone;
- providing at least one first power supply segment to be coupled to a first designated line voltage outlet to deliver line voltage power to each of the designated number of mounting sectors in the first power delivery zone; and
- configuring the designated number of mounting sectors along the first power delivery zone according to a first combined lighting unit power rating for the first power delivery zone to approach but not exceed a maximum power delivery rating of the first line voltage outlet; to enable any one of the designated number of interchangeable lighting modules to be moved from one mounting sector to another mounting sector in the designated number thereof, and still comply with the maximum power delivery rating of the first line voltage outlet; and
- selecting the designated number of interchangeable lighting modules from one or more track lighting modules, or one or more non-track lighting modules.

In some example embodiments, the method may further comprise configuring each of the one or more track lighting modules, or one or more non-track lighting modules to deliver low voltage power to at least one array of LEDs associated therewith.

In another aspect, there is provided a kit for assembling a lighting system, comprising a plurality of grid segments configured to be assembled into a grid network for supporting a plurality of interchangeable lighting modules at a plurality of mounting sectors defined by the grid network. Also provided is a power supply segment to be coupled to a designated line voltage outlet to deliver line voltage power to each of the mounting sectors in a designated power delivery zone in the grid network defined by: a designated number of the plurality of mounting sectors in the designated power delivery zone; and a designated number of the plurality of interchangeable lighting modules for mounting in the designated power delivery zone. The designated power delivery zone is configured to define a combined lighting unit power rating to approach a maximum power delivery rating of the designated line voltage outlet, wherein the designated number of the plurality of interchangeable lighting modules is selected from one or more track lighting modules or one or more non-track lighting modules.

In another aspect, there is provided a kit for assembling a grid lighting network, comprising: a first plurality of grid segments, each configured to be assembled to form the grid lighting network and to define a second plurality of mounting sectors therein, with each mounting sector configured to operatively couple with a corresponding one of a third plurality of lighting modules. At least one first power supply segment is configured to be associated with the grid lighting network and to be coupled to a first line voltage outlet to deliver line voltage power to each of the mounting sectors in at least one first power delivery zone in the grid lighting network, wherein the at least one first power delivery zone is defined by: a designated first number of the second plurality of mounting sectors; and a designated first number of the third plurality of lighting modules. The at least one first power delivery zone is configured according to a first combined lighting unit power rating for the first power delivery zone to approach but not exceed a maximum power delivery rating of the first line voltage outlet, to enable any one of the designated first number of lighting modules to be moved from one of the mounting sectors in the designated first number thereof to another of the mounting sectors in the designated first number thereof, and still comply with the maximum power delivery rating of the first line voltage outlet. The designated first number of lighting modules is selected from one or more track lighting modules and/or one or more non-track lighting modules.

Some example embodiments may further comprise a plurality of hub structures to couple the first plurality of grid segments together to form the grid lighting network.

Some example embodiments may further comprise the first number of lighting modules.

In some example embodiments, the at least one first power supply segment may include one or more line voltage outlet plugs spaced along each mounting sector of the designated first number thereof.

In some example embodiments, each of a group of one or more of the line voltage outlet plugs may be mounted on a corresponding cable segment to engage a complementary line voltage inlet plug in the corresponding lighting module.

In some example embodiments, each track lighting module of the designated first number of lighting modules may be configured to receive one or more lighting submodules, wherein each lighting submodule may include one or more arrays of one or more LEDs, and a submodule driver. Each track lighting module may further comprise a second power supply segment configured to deliver low voltage power to the submodule driver.

In some example embodiments, the submodule driver may be a class 2 driver or another driver.

In some example embodiments, each non-track lighting module in the first number of lighting modules may include one or more arrays of one or more LEDs, and a constant current driver to deliver substantially constant current thereto.

In some example embodiments, each non-track lighting module may further comprise a first power controller segment for controlling a first power level of output power to be delivered by the constant current driver to the one or more arrays of one or more LEDs.

In some example embodiments, the first power controller segment may be configured to be addressable in a wired and/or wireless network to receive commands to set the first power level.

In some example embodiments, the first power controller segment may be configured to communicate with a first wireless sensor segment to exchange signals on the wireless network.

In some example embodiments, the non-track lighting module may include a passage to receive the first wireless sensor segment.

In some example embodiments, the second power supply segment may further comprise a second power supply and a second power controller segment for controlling a second power level of output power to be delivered by the second power supply to the one or more lighting submodules.

In some example embodiments, the second power controller segment may be configured to be addressable in a wired and/or wireless network to receive commands to set the second power level.

In some example embodiments, the second power controller segment may be configured to communicate with a second wireless sensor segment, to exchange signals in the wireless network.

In some example embodiments, the non-track lighting module may include a passage to receive the second wireless sensor segment.

In some example embodiments, a designated first number of one or more of the first plurality of grid segments may be configured to provide at least one lighting zone, wherein the at least lighting zone includes at least one direct lighting zone and/or an indirect lighting zone.

In some example embodiments, the at least one first power supply segment may be configured to receive the line voltage power at a voltage of from about 120 volts to about 277 volts at 60 watts.

In some example embodiments, the second power supply segment may be configured to deliver the low voltage at a voltage of from about 12 to about 48 volts at 60 watts.

In some example embodiments, the least one first power supply segment may comprise a plurality of first power supply segments, with each thereof integrated into a corresponding grid segment. Each of the first power supply segments may be configured to be electrically coupled with one or more adjacent first power supply segments in the grid network at a corresponding hub structure.

In another aspect, there is provided a lighting system comprising at least one grid network configured to provide a plurality of mounting sectors therein and to deliver line voltage power to each of the mounting sectors from a single line voltage power source, each of the mounting sectors configured to receive at least one track lighting module and/or at least one non-track lighting module for delivery of light to an interior space adjacent the at least one grid network, each of the at least one track lighting module and/or at least one non-track lighting module being operatively associated with one or more arrays of one or more LEDs, and each of the at least one track lighting module and/or at least one non-track lighting module being configured to receive the line voltage power from a corresponding mounting sector and to deliver low voltage power to the one or more arrays of one or more LEDs associated therewith.

In some example embodiments, each of the track lighting modules may be configured to receive one or more lighting submodules. Each lighting submodule may include at least one of the one or more arrays of one or more LEDs, and a submodule driver. Each track lighting module may further comprise a second power supply segment which may be configured to deliver the low voltage power to the submodule driver to power the at least one of the one or more arrays of one or more LEDs.

In some example embodiments, the grid network may further comprise a plurality of standardized grid segments which may be configured for assembly in any one of a plurality of grid network configurations, such that any one of the track lighting modules and/or any one of the non-track lighting modules may be engageable with any one of the mounting sectors.

In some example embodiments, the grid network may further comprise a plurality of standardized hub segments for interconnecting the plurality the standardized grid segments.

In some example embodiments, one or more of the grid segments may include a housing segment structure, each of which may define a first channel to define at least one mounting sector. The track lighting module and/or non-track lighting module may be removably secured therein.

Some example embodiments may further comprise a first power supply segment associated with the housing structure for delivering the line voltage power to the mounting sector. The track lighting module and/or non-track lighting module may include a second power supply segment to receive the line voltage power and to deliver low voltage power to the array.

In some example embodiments, each of the at least one track lighting module and/or the at least one non-track lighting module may include one or more releasable locking structures to removably lock the corresponding track lighting module and/or non-track lighting modules in the first channel.

In some example embodiments, the track lighting module may be configured to be received in the first channel in a configuration to receive the one or more lighting submodules.

In some example embodiments, the track lighting module may include a track structure defining a second channel, and the lighting submodule may include coupling structure to be received by the track structure in the second channel in an operative position wherein the track structure and the coupling structure are configured to deliver the low voltage power to the lighting submodule.

In some example embodiments, the coupling structure may include a power supply segment to deliver a second low voltage power to the array.

In some example embodiments, the lighting submodule may include bridging structure to enable electrical connections between the coupling structure and the at least one array.

Some example embodiments may further comprise mounting structure to releasably mount the lighting submodule to the housing structure with the coupling structure in the operative position.

In some example embodiments, the mounting structure may include at least one arm which may be configured to extend along a corresponding boundary of the housing structure and a retaining structure to releasably engage the arm and the housing structure.

In some example embodiments, the mounting structure may include a pair of arms which may be configured to extend along opposite boundaries of the housing structure, and the retaining structure is configured to releasably engage at least one of the arms and the housing structure.

In some example embodiments, the lighting submodule may further comprise anchoring structure to anchor at least one pendant or non-pendant light fixture thereto containing at least one of the one or more arrays.

In some example embodiments, therein the non-track lighting module may be configured to be received in the first channel in a configuration to anchor at least one pendant or non-pendant light fixture thereto containing at least one of the one or more arrays.

In some example embodiments, the non-track lighting module may include a coupling structure to be received in the first channel and which may be configured to receive the line voltage power from the mounting sector and to deliver the low voltage power to the at least one pendant or non-pendant light fixture thereto.

In some example embodiments, the non-track lighting module may include bridging structure to enable electrical connections between the coupling structure and the at least one pendant or non-pendant light fixture.

In some example embodiments, the one or more releasable locking structures may include one or more latches movable between a released position and a locking position, wherein in the locking position the one or more latches may engage a complementary stop segment associated with the housing segment structure adjacent the first channel.

In some example embodiments, the least one grid network may be configured so that any one of the one or more mounting sectors may be addressable in a wired and/or wireless network to receive operational commands for delivering the line voltage power to the at least one track lighting module and/or at least one non-track lighting module.

In some example embodiments, the at least one track lighting module and/or at least one non-track lighting module may be configured to be addressable in a wired and/or wireless network to receive operational commands for controlling the lower voltage power to be delivered to the one or more arrays of one or more LEDs.

In some example embodiments, the first and/or second power supply segments may be configured to be addressable in a wired and/or wireless network to receive operational commands for controlling the corresponding line voltage power to be delivered to the at least one track lighting module and/or at least one non-track lighting module, and/or the corresponding low voltage power to be delivered to the one or more arrays of one or more LEDs.

BRIEF DESCRIPTION OF THE FIGURES

Several example embodiments of the present disclosure will be provided, by way of examples only, with reference to the appended drawings, wherein.

DETAILED DESCRIPTION

Figure 1:
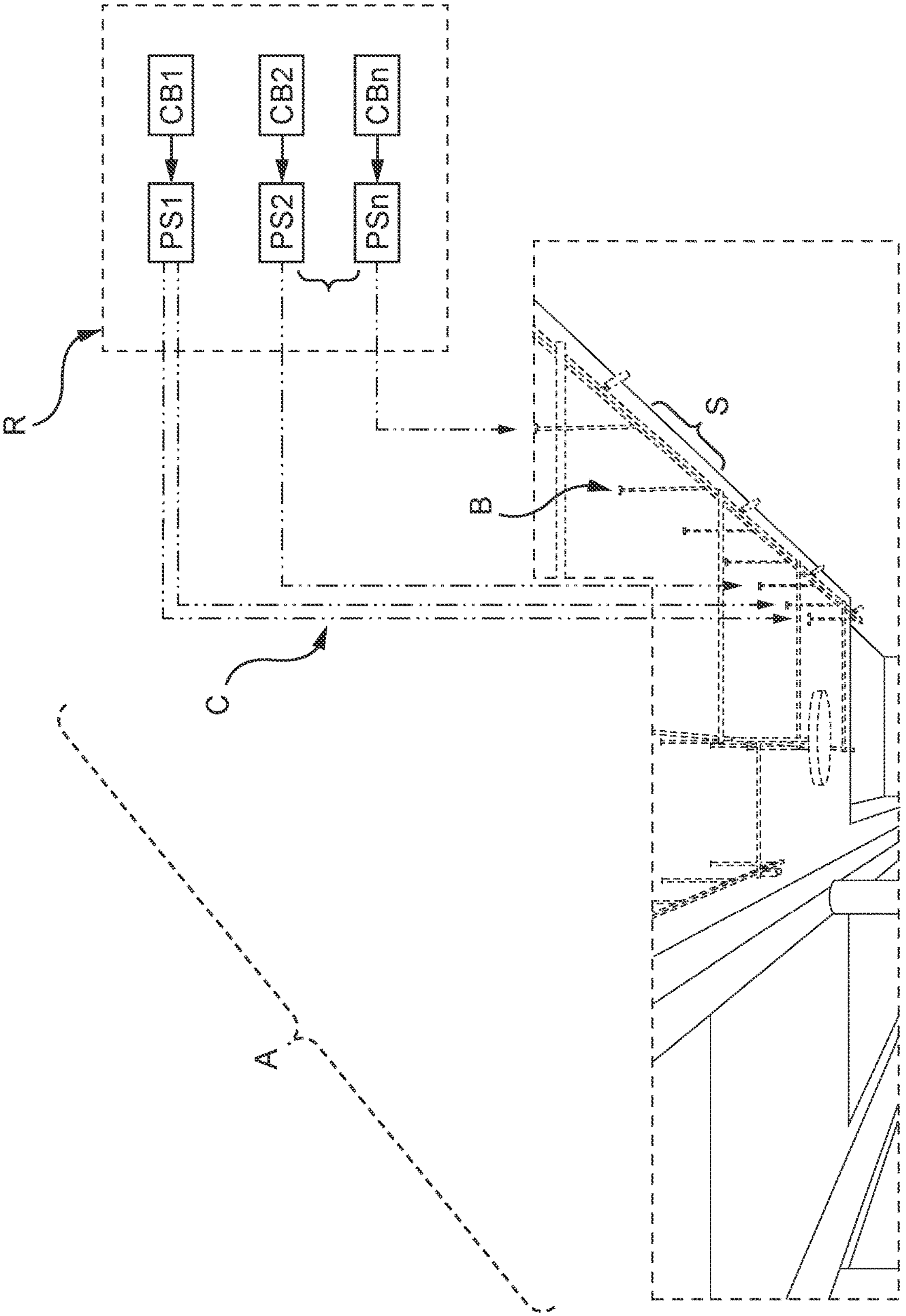
FIG. 1 (PRIOR ART)
FIG. 1 is a schematic view of a prior art grid lighting system.

It should be understood that the invention is not limited in its application to the details of construction and the arrangement of components set forth in the following description or illustrated in the drawings. The invention is capable of other example embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical, mechanical or other connections or couplings. The terms upper, lower, vertical and horizontal are intended for operative context only and are not necessarily intended to limit the invention only to those configurations or orientations. Furthermore, and as described in subsequent paragraphs, the specific mechanical, electrical and/or other configurations illustrated in the drawings are intended to exemplify embodiments of the invention. However, other alternative mechanical, electrical and/or other configurations are possible which are considered to be within the teachings of the instant disclosure.

The terms "line voltage" and "line voltage power" may include, but not limited to, the voltage (and power) that a power line delivers to its destination, or the point where it is being used, such as from about 120V to about 277V at 60 W, or other such voltage levels appearing in power distribution systems in building structures.

The terms "low voltage", "low voltage power" and "low power" used herein may include, but not limited to, the voltage (and power) such as specified in Class 2 UL (formerly known as Underwriters Laboratory) that is rated for electrical appliances such as lighting units, such as 48V at 60 W maximum, or other such voltage and power levels specified in residential and commercial building codes.

The term "configured installation" used herein in the context of a grid lighting network or system may include, but not limited to, an installation which is configured according to an appropriate building or energy code, including one or more instances of a specified length of a lighting (or power delivery) zone and a specified number of interchangeable line voltage lighting modules deployable therein, in order to approach, but not exceed, a maximum power delivery rating of a designated line voltage outlet (such as a circuit breaker) to power the lighting (or power delivery) zone, to enable any one of the interchangeable line voltage lighting modules to be moved from one designated location to another along the specified length of the lighting (or power delivery) zone, and still comply with the maximum power delivery rating of the designated line voltage outlet.

The terms "grid lighting system", "grid lighting network", "grid area", "grid segment", "grid configuration", and other terms using the adjective "grid" herein may include, but not limited to, single or multiple configurations of a track, housing or other support structure, in any one or more of such configurations as T-, L-, U-, square-shaped or other configurations or combinations thereof, such as a number of x and y lengths found at one or more hubs, intersecting two or more tracks, housings or other support structures. The grid segments may be in the form of standardized or non-standard grid segments.

While the drawings show and the description describes the "grid" components generally defining a 2-dimensional configuration, it is to be understood this is done merely for convenience in the drawings and description. It is to be understood by one possessing the teachings of this specification, drawings, and claims as set forth herein, as may be amended during the prosecution, that the "grid" may extend into a third dimension and incorporate components not limited to a 2-dimensional configuration.

The term "LED" used herein may include, but not be limited to, semiconductor, electroluminescent, organic, polymeric or other material based light sources commonly known as generally as light emitting diodes, as well as polymeric and other such light sources, equivalents and variants thereof.

The term "track lighting module" used herein may include, but not limited to, an interchangeable lighting device which provides a track or other elongate supportive structure for supporting an array of one or more interchangeable lighting submodules, for example with one or more arrays of LEDs, i.e. those which are configured to electrically couple with the track or other elongate support.

The term "non-track lighting module may include, but not limited to, an interchangeable lighting device which does not provide a track or other elongate supportive structure for supporting an array of one or more interchangeable lighting submodules, for example with one or more arrays of LEDs.

FIG. 1 shows a prior art version of a grid lighting system A, having a number of "low voltage" line drops B, which are normally provided at a designated distance, such as 8 feet, along each span S in a designated grid area. Each of the line drops B is coupled to a dedicated "low voltage" supply line C, which is powered by a power supply PS, which in turn is coupled to a designated "line voltage" circuit breaker CB. In this case, a power supply PS is required for one or several "low voltage" line drops B, and power supply PS1 is shown to supply power to two such "low voltage" supply lines C. Further, the group of power supplies PS is usually provided in a remote utility room location R housing the circuit breakers CB. This can sometimes require a considerable length of "low voltage" supply line extending between each power supply PS and the at least one corresponding line drop B. For instance, in a grid lighting system with 50 such "low voltage" line drops, there would be a corresponding requirement for power supplies PS1 to PSn, where n=50 or a subset thereof, with the consequent requirement of 50 lengths of low voltage power supply line between the power supplies PS and a corresponding "low voltage" line drop. (The thickened arrows between each circuit breaker CB and the adjacent power supply PS in FIG. 1 denotes "line voltage", in this case between each circuit breaker CB and the corresponding power supply PS.)

Figure 2:
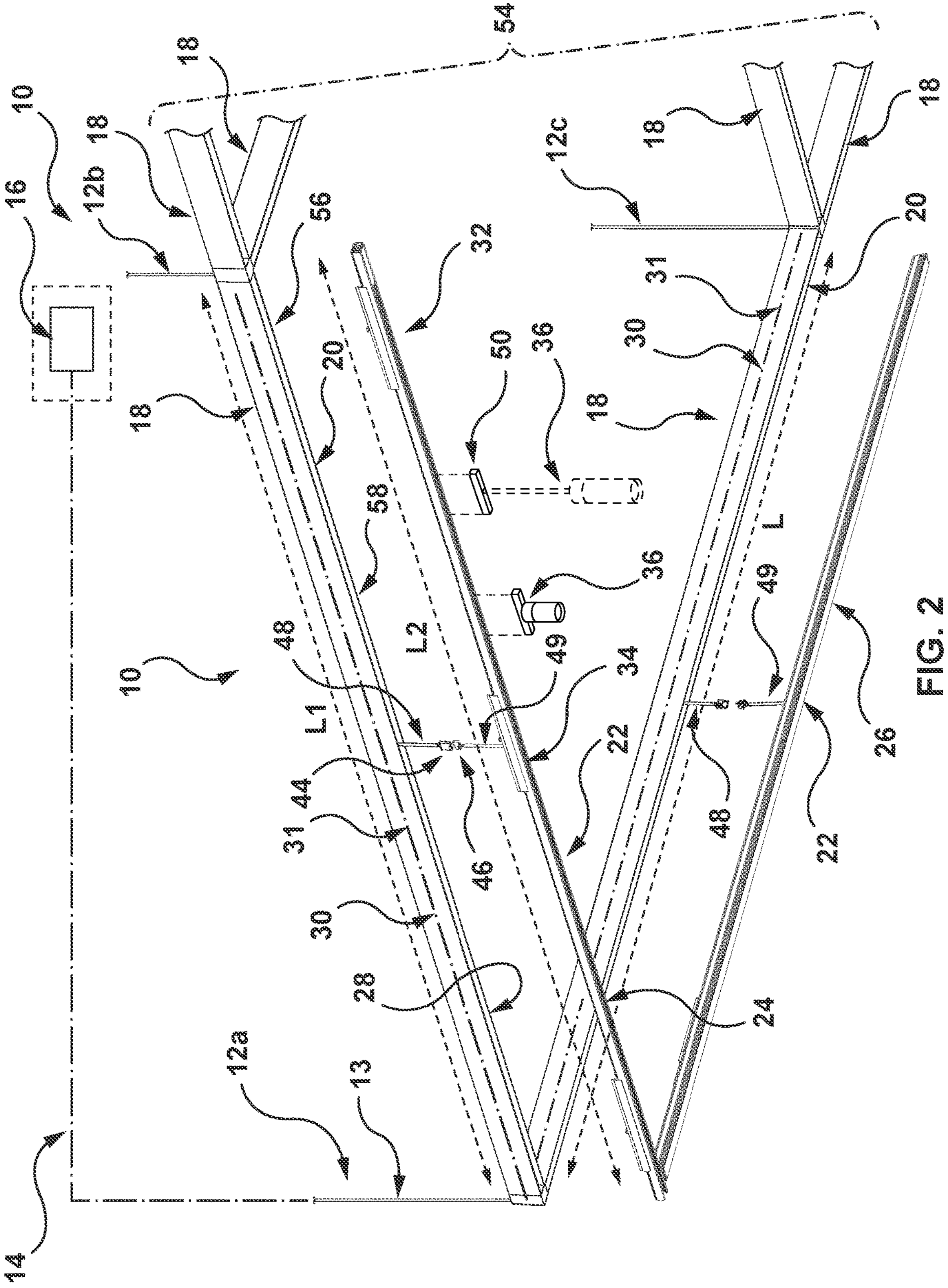
FIGS. 2, 3 and 4 are schematic fragmentary perspective views of a grid lighting system according to the present disclosure.

FIG. 2 shows an example embodiment in the form of a grid lighting system 10, with a single "line voltage" line drop 12*a* which, in this case, is held in at least one stem structure as shown at 13. Thus, while there may be a number of stem structures 13 supporting the grid lighting system 10, only one is shown to include a line drop 12, in this example, and thus to supply all the spans in a designated grid area. The single "line voltage" line drop 12*a* is coupled to a single "line voltage" supply line 14, which is drawn in a thickened chain-dotted line to denote "line voltage" (in contrast to the "low voltage" supply line C (shown as chain-double-dotted) in FIG. 1). The line voltage supply line 14 is in turn directly coupled to a single designated circuit breaker 16. As will be described, the line voltage supply line 14 is able to service an entire designated grid area, as will be described. Other example embodiments may involve multiple such grid areas in a corresponding multiple of configured installations for a correspondingly larger target space to be illuminated, with each supplied by a single line voltage line drop. Nonetheless, example embodiments as disclosed may provide a substantial increase in efficiency and a reduction in assembly costs, at scale.

Figure 3:
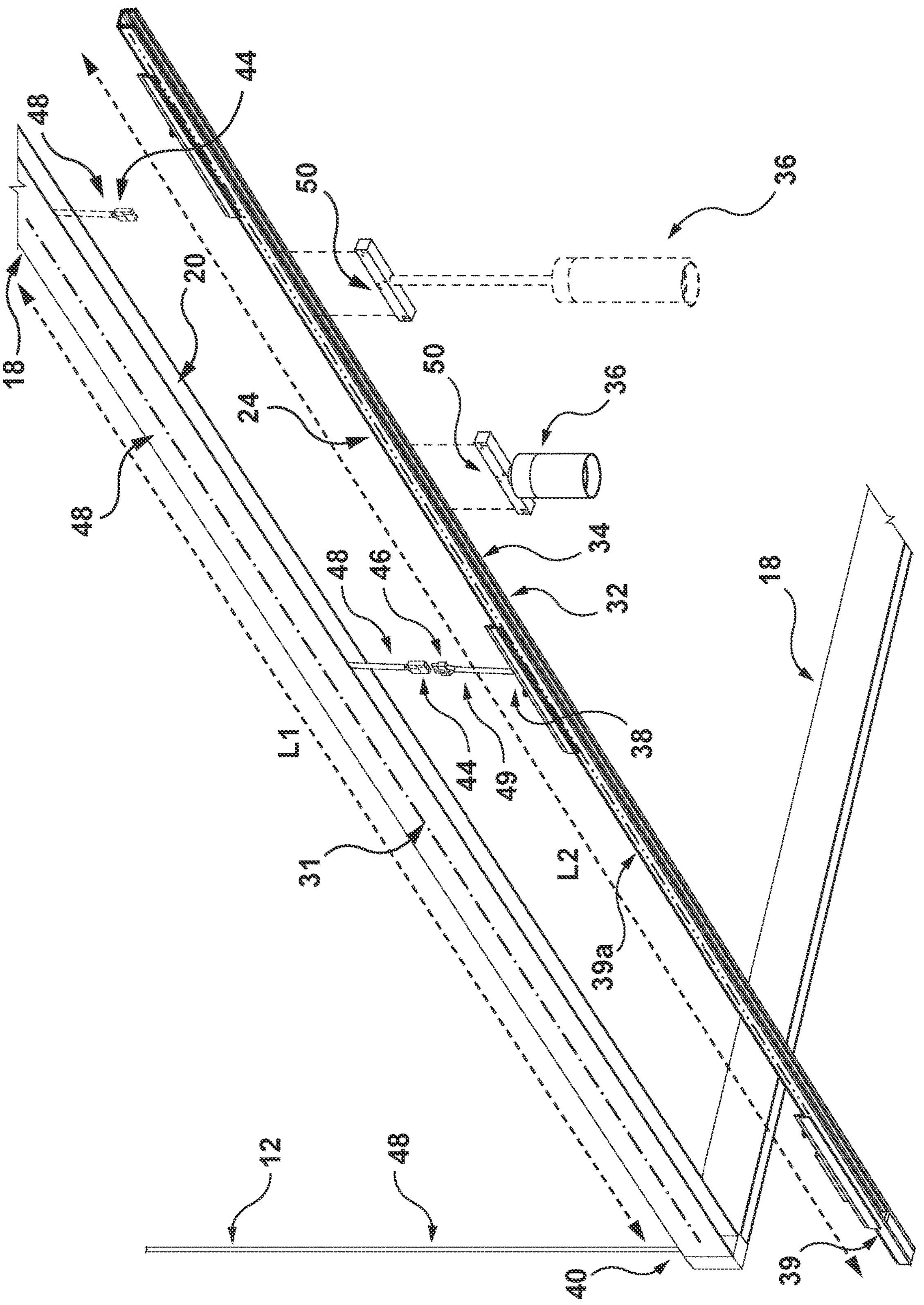
Figure 4:
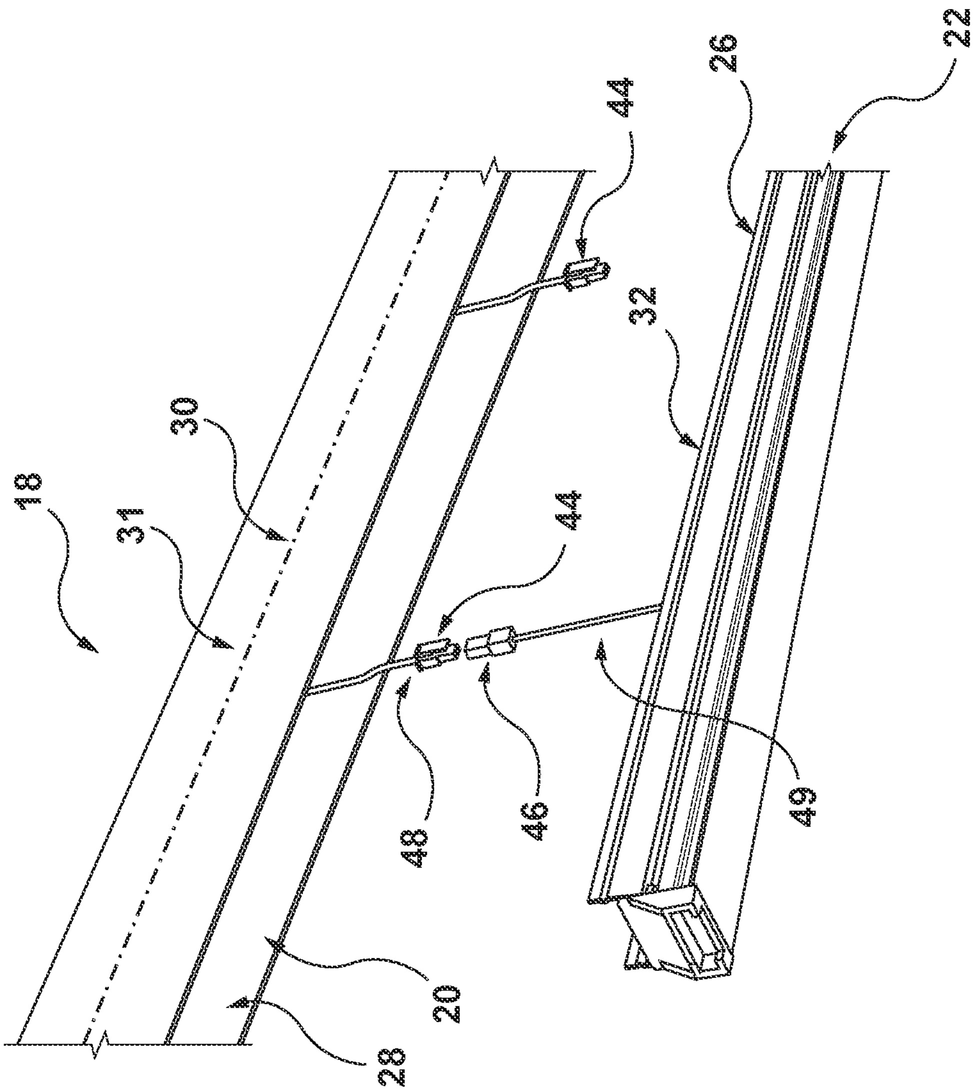

Referring to FIGS. 2, 3 and 4, the grid lighting system 10 comprises at least one elongate support structure, which may be in the form of a housing segment, in this example embodiment showing six such housing segments 18, each with a lighting zone 20. In this case, line drops 12*b* and 12*c* do not include or provide a line voltage supply line 14.

Also provided is at least one lighting module 22, which may be selected from at least one track lighting module 24 and/or at least one non-track lighting module, shown schematically at 26. Referring to FIGS. 2, 3 and 4, the lighting zone 20 of each housing segment 18 is configured to extend along a first length dimension L1 of the corresponding housing segment 18, and includes at least one first passage 28 (FIG. 4) extending at least part way along the lighting zone 20, to receive the at least one lighting module 22 therein. Each housing segment 18 includes a first power supply segment 30, which is in communication with line voltage supply line 14, to deliver line voltage power to the at least one lighting module 22 in the lighting zone 20. In this case, the first power supply segment 30 includes a first power supply cable harness, a portion of which is shown schematically at 31 (as will be further described below) extending along the housing 18. In other example embodiments, the elongate support structure may be provided as a rigid, or flexible support structure, such as a frame structure, without necessarily having a housing segment, and which may receive a lighting module thereon.

Referring to FIG. 3, each track lighting module 24 may include a lighting subzone 32 extending along a second length dimension L2 thereof. In this case, the second length dimension L2 is aligned with the first length dimension L1. In other example embodiments, the second length dimension L2 may be positioned relative to the first length dimension L1 at a non-aligned angle such as, for example, an included angle of less than 90 degrees, or less than 180 degrees.

The lighting subzone 32 may include a second passage 34 extending at least part way along the lighting subzone 32 to receive at least one lighting submodule, in this case with two such submodules shown at 36. Referring to FIG. 3, a second power supply segment 38 is configured to couple with the first power supply cable harness 31 to receive line voltage power therefrom and to deliver low voltage to the lighting submodules 36. In this case, the second power supply segment 38 includes a power supply 39 and a second power supply cable harness 39*a* (denoted by the chain double-dotted line) extending along the second length dimension L2 of the lighting subzone 32 to deliver lower voltage power to each of the lighting submodules 36.

Referring to FIG. 2, the first power supply cable harness 31 is thus configured in a first mode to deliver line voltage power to the at least one lighting module 22, and in a second mode (FIG. 3) to cooperate with the second power supply segment 38 in the at least one track lighting module 24 to deliver line voltage power to the second power supply 39, which in turn is configured to deliver low voltage to the at least one lighting submodule 36 via the second power supply cable harness 39*a*.

Referring to FIG. 3, also provided is at least one hub segment 40 to join with at least two of the housing segments 18 to form a designated grid configuration. As shown in FIG. 3, the hub segment 40 may also be coupled with the line drop 12 which may include a support cable, or a stem structure with a ½" (or other) diameter stem structure, as an example. Examples of the hub segment 40 and housing segments 18 may be found in co-pending U.S. patent application Ser. No. 16/795,153, filed Feb. 19, 2020 and entitled COUPLERS FOR LIGHT FIXTURES, related U.S. patent application Ser. No. 15/299,168, filed Oct. 20, 2016, now granted as U.S. Pat. No. 10,215,380, and related U.S. patent application Ser. No. 16/256,356, filed Jan. 24, 2019, now granted as U.S. Pat. No. 10,584,857, the entire subject matter of both of which is incorporated herein by reference.

Figure 8:
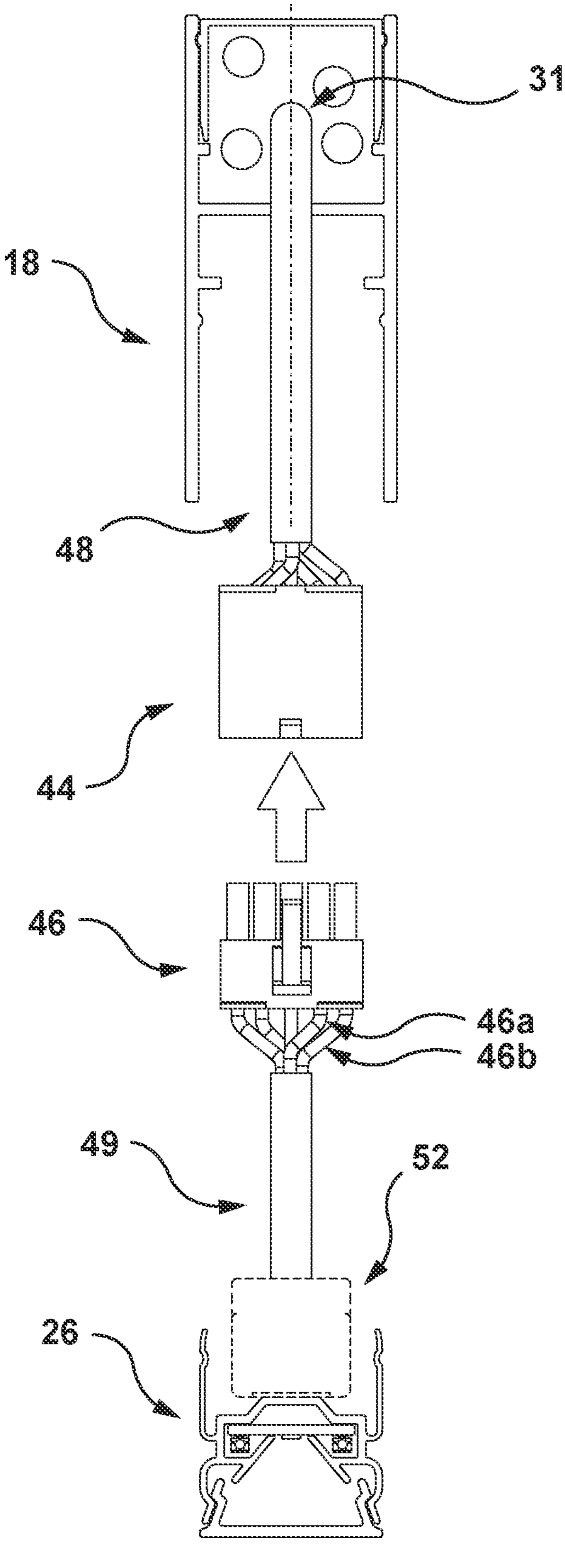
FIGS. 8 and 9 are part-sectional assembly views of a non-track lighting module and a track lighting module, respectively, in the grid lighting system of FIGS. 2, 3 and 4.
Figure 9:
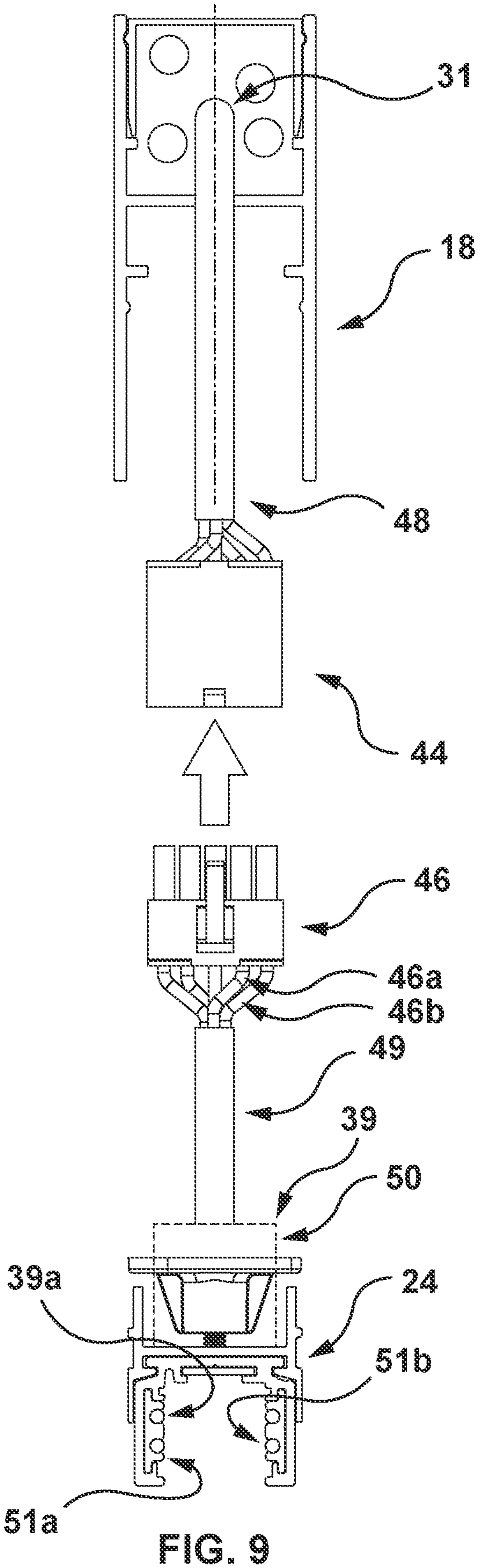
Figure 10:
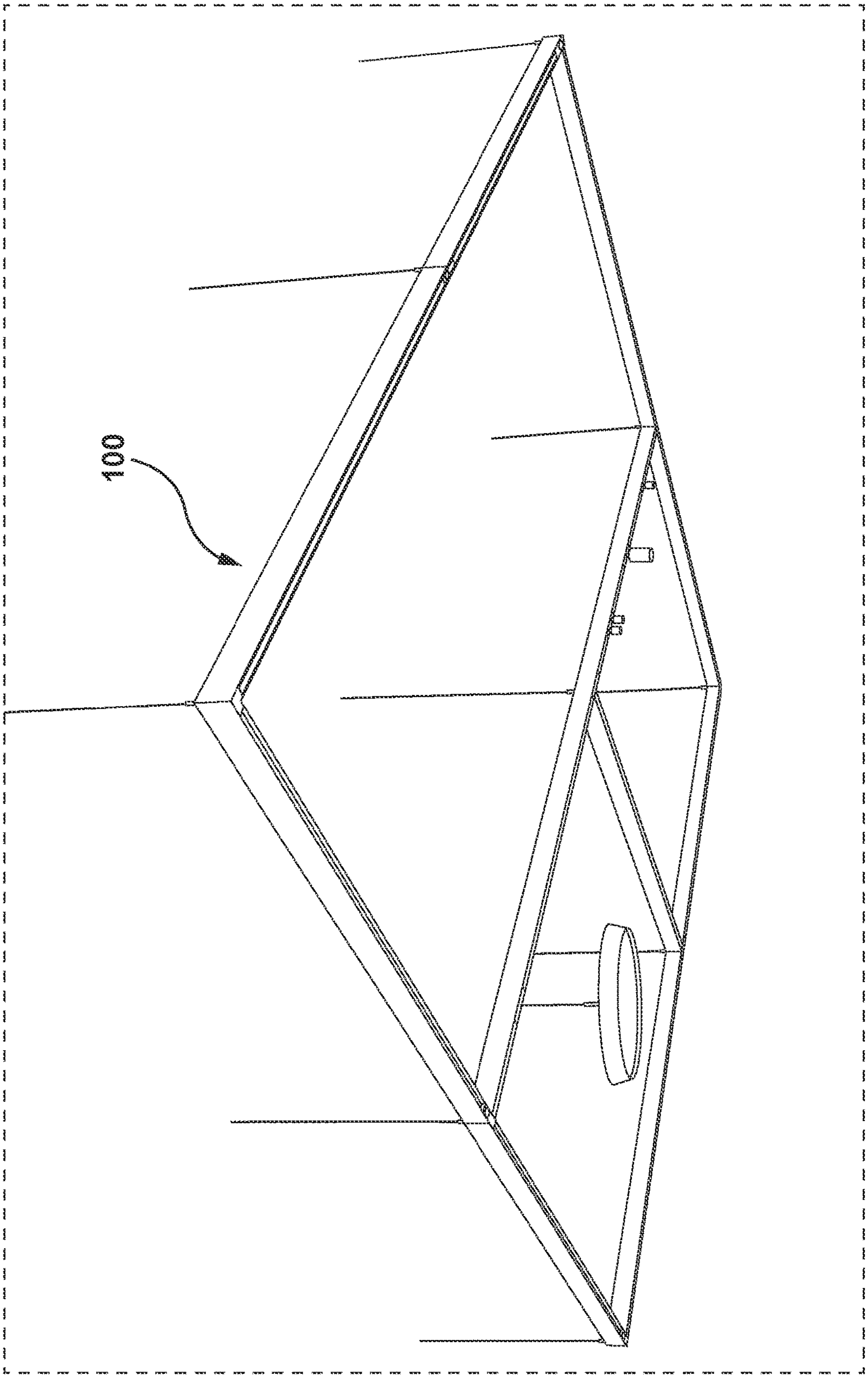
FIG. 10 is a perspective view of a grid lighting system network.

Referring to FIGS. 2, 3, 4, 8 and 9, in some example embodiments, the first power supply cable harness 31 may include a power line extending along the housing with each of a plurality of line voltage outlet plugs 44 (FIG. 3) located on a corresponding cable 48, which may be joined to the supply line 14 and spaced along the first length dimension L1, for connection to a complementary line voltage inlet plug 46 located on a corresponding cable 49. The cable 49 may extend from the track lighting module 24 (as shown in FIGS. 3 and 9) to be an input to the second power supply 39, or to extend from the non-track lighting module 26 (as shown in FIGS. 4 and 8). Thus, with reference to FIG. 3, a group of line voltage outlet plugs 44 may each be mounted on a corresponding cable 48 (not shown) to engage a matching line voltage inlet plug 46 on a corresponding cable 49 in the corresponding track lighting module 24, or non-track lighting module 26. The number of line voltage outlet plugs 44 can thus be configured as part of a kit, as will be described.

Referring to FIGS. 3 and 9, in some example embodiments, each of the one or more lighting submodules 36 may be configured to include a class 2 driver 50, while the second power supply 39 may thus be configured to deliver substantially constant voltage thereto, while the driver 50 may be configured to adjust the illumination of the lighting submodule 36 by stepping down the voltage delivered thereto. As shown in FIG. 9, the second supply cable harness 39*a* may include a number of conductive paths provided by exposed cables extending along opposite boundaries of the subzone. For example, the exposed cables 51*a* may be configured to present substantially constant voltage along the second passage 39, while exposed cables 51*b* may be configured as a part of a wired communications network channel to deliver commands to set the power level of the driver 50, as will be described. The wired communications network channel may thus originate from a corresponding number of strands 46*a*, 46*b* of cable 49 coupled to the inlet plug 46, or wired communications channel separate therefrom.

Referring to FIGS. 4 and 8, in some example embodiments, each of the non-track lighting modules 26 may include a constant current driver 52, and the first power supply cable harness 31 may be configured to deliver line voltage power thereto. Similarly, the constant current driver 52 may be controlled by way of a wired communications network channel originating from a corresponding number of strands 46*a*, 46*b* of cable 49 coupled to the inlet plug 46, or another wired or wireless communications channel separate therefrom.

Referring to FIGS. 2 and 4, some example embodiments may be provided in the form of a kit for assembling a grid lighting network or grid network shown in part at 54. The kit may comprise a first plurality of housing (or grid) segments 18 configured to be assembled to form the grid network 54, by way of a plurality of hub segments 40, to define a second plurality of mounting sectors 56 in lighting zone 20 for supporting each of a third plurality of lighting modules 22, which in the case of grid lighting system 10 may be defined along the first passage 28. In the case of FIG. 2, each of the track lighting module 24 and/or the non-track lighting module 26 may have a second length dimension L2 equal to or approximating the first length dimension L1 of the corresponding housing segment 18, which may mean that each housing segment 18 may have one such mounting sector 56. In other example embodiments, where the track lighting modules 24 and/or the non-track lighting modules 26 may have a shorter length than the corresponding housing segment 18, the latter may provide more such mounting sectors 56 as the case may be. In still other example embodiments, the dimensions of the mounting sectors 56 may not be particularly relevant in respect of the dimensions of a corresponding track or non-track lighting module, for example if the latter is a pendant.

The kit may also comprise at least one first power supply segment 30 (such as in the form of the first power supply cabling harness 31) to be coupled to a first line voltage outlet, such as the circuit breaker 16, to deliver line voltage power to each of the mounting sectors 56 in at least one first power delivery zone 58 in the grid lighting network 54. The first power supply cabling harness 31 may be formed by individual segments installed in each corresponding housing segment 18, and configured to be in communication with one another throughout the mounting sector 56 of the grid lighting network 54 to be supplied by the supply line 14, by way of electrical connections made between such individual housing segments 18 at each corresponding hub segment 40. In other example embodiments, the first power supply cabling harness 31 may be installed in the corresponding mounting sector 56 of the grid lighting network 54 once assembled.

The first power delivery zone 20 may thus be defined by:

i. a designated number of the mounting sectors 56; and
ii. a designated number of the lighting modules 22, each configured for mounting in the first power delivery zone 58 at one of the designated number of mounting sectors 56.

In some example embodiments, the first power delivery zone 58 may also be defined by a designated number of the grid segments 18.

The first power delivery zone 58 may be configured according to a first combined lighting unit power rating for the first power delivery zone 58 to approach but not exceed a maximum power delivery rating of the first line voltage outlet, such as the current breaker 16, to enable any one of the designated number of mounting lighting modules 22 to be moved from one of the mounting sectors 56 to another mounting sector 56 in the designated number thereof, and still comply with the maximum power delivery rating of the first line voltage outlet.

Thus, in some example embodiments, a single delivery zone 58 powered by the circuit breaker 16, may be configured to approach but not exceed a maximum power delivery rating of a first line voltage outlet, such as the current breaker 16. In other example embodiments, a plurality of delivery zones 58 may be powered by the circuit breaker 16, in which case the plurality of power delivery zones 58 may be configured to approach but not exceed a combined maximum power delivery rating of the current breaker 16.

In some example embodiments, the designated number of lighting modules 22 may be selected from one or more track lighting modules 24 and/or one or more non-track lighting modules 26.

In some example embodiments, a method may be provided to prepare a configured installation of a grid lighting network installation in a target space, with a designated space, such as an interior space, and/or a designated purpose or function. The present method may allow for the grid lighting network installation to be reconfigured after the original installation should the primary interior space or a portion thereof, and/or designated purpose or a portion thereof change following original installation. While an interior space is referred to herein it should be understood that the present structures and functions will also perform in a substantially similarly if not in an identical manner in an exterior setting, combination of interior and exterior, or other settings.

A first step may be to provide a plurality of grid segments 18 which are each configured to be assembled into the grid lighting network 54 for supporting each of a plurality of interchangeable lighting modules 22 at a corresponding one of a plurality of mounting sectors 56 defined on the grid lighting network 54. Next, the plurality of grid segments 18 may be allocated to at least a first power delivery zone 58, defined by:

i. a corresponding designated number of mounting sectors 56 along the designated first power delivery zone 58; and
ii. a designated number of the interchangeable lighting modules 22, each for mounting at any one of the designated first number of mounting sectors 56 in the first designated power delivery zone 58.

Another step may be to provide at least one first power supply, such as first power supply segment 31, to be coupled to a first line voltage outlet, such as one or more outlet plugs 44, to deliver line voltage power to each of the number of mounting sectors 56 in the first power delivery zone 58.

Another step may be to configure the designated number of mounting sectors 56 in the first power delivery zone 58 according to a first combined lighting unit power rating for the first power delivery zone 58 to approach, but not exceed, a maximum power delivery rating of the first line voltage outlet, such as one or more outlet plugs 44. This step may thus enable any one of the designated number of lighting modules 22 to be moved from one mounting sector 56 of the designated number to another mounting sector 56 thereof, and still comply with the maximum power delivery rating of the first line voltage outlet.

Another step may be to select the designated number of interchangeable lighting modules 22 from one or more track lighting modules 24, or one or more non-track lighting modules 26.

Figure 5:
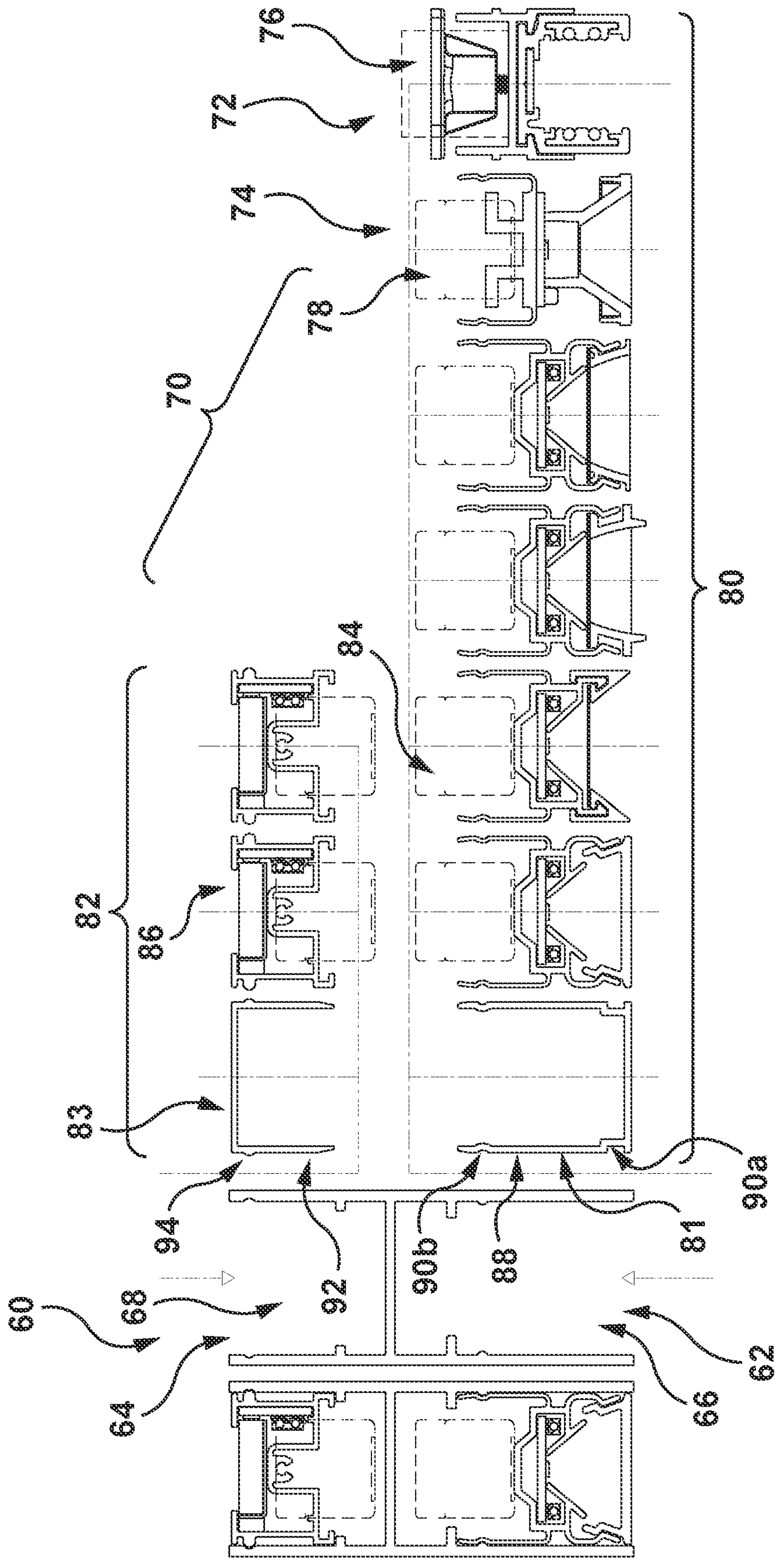
FIGS. 5, 6 and 7 are schematic sectional views of luminaire structures and/or portions thereof for use in the grid lighting system of FIGS. 2, 3 and 4.

FIG. 5 shows another example embodiment of a housing segment 60 which is configured to be assembled to form the grid network 54 as discussed herein. The housing segment 60 has a direct lighting zone 62 and an oppositely oriented indirect lighting zone 64, which in this case is opposite the direct lighting zone. Each zone 62, 64 extends along a length dimension of the housing segment 60 and includes a corresponding passage 66, 68 to receive one or more lighting modules therein, such as those shown collectively at 70.

The collection of lighting modules 70 may include at least one track lighting module 72 and at least one non-track lighting module 74. In the case, the collection of lighting modules 70 includes a number of different lighting configurations among the many that may be used. Each track lighting module 72 therein, in this example, may include a constant voltage driver 76, while the non-track lighting module 74 may include a constant current driver 78.

Each of the lighting modules in the collection 70 may be further configured into, or be selected from, a direct group 80 and an indirect group 82, wherein each has a housing structure 84, 86 which may be configured to fit exclusively in its corresponding direct passage 66 or indirect passage 68 respectively. For instance, each lighting module in the direct group 80 may be provided with at least one dimension and/or formation which differs from a corresponding at least one dimension and/or formation of each lighting module in the indirect group 82.

In the case of the lighting modules in direct group 80 of FIG. 5, each may have a pair of side wall sections 88 which are longer (or shorter) in vertical section and may be provided with one or more surface formations such as recesses 90*a*, 90*b*. Meanwhile, each of the lighting modules in indirect group 82 may have a pair of sidewall sections 92 which are shorter (or longer) in vertical section and may be provided with one or more surface formations such projections 94. The indirect group 80 and direct group 82 each includes end wall sections 81 and 83 to be used in place of a corresponding lighting module in some examples.

Figure 6:
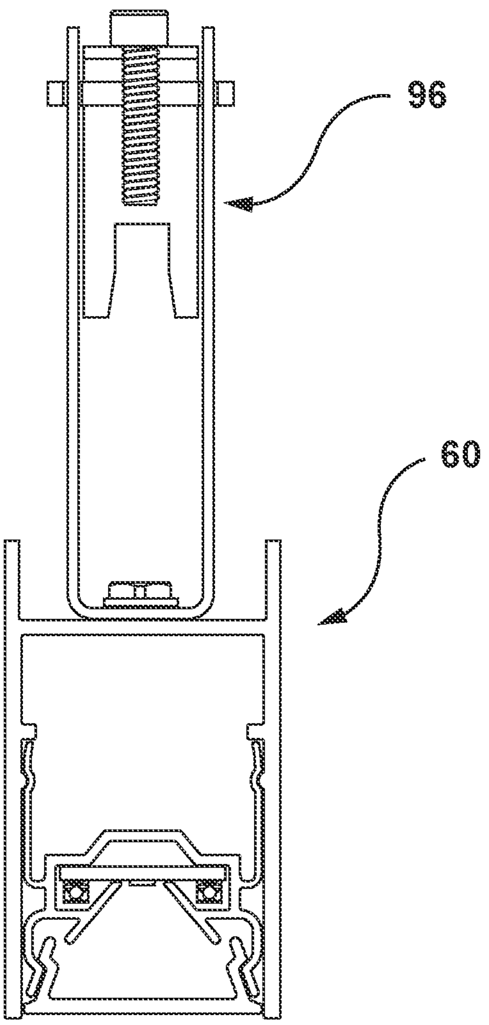
Figure 7:
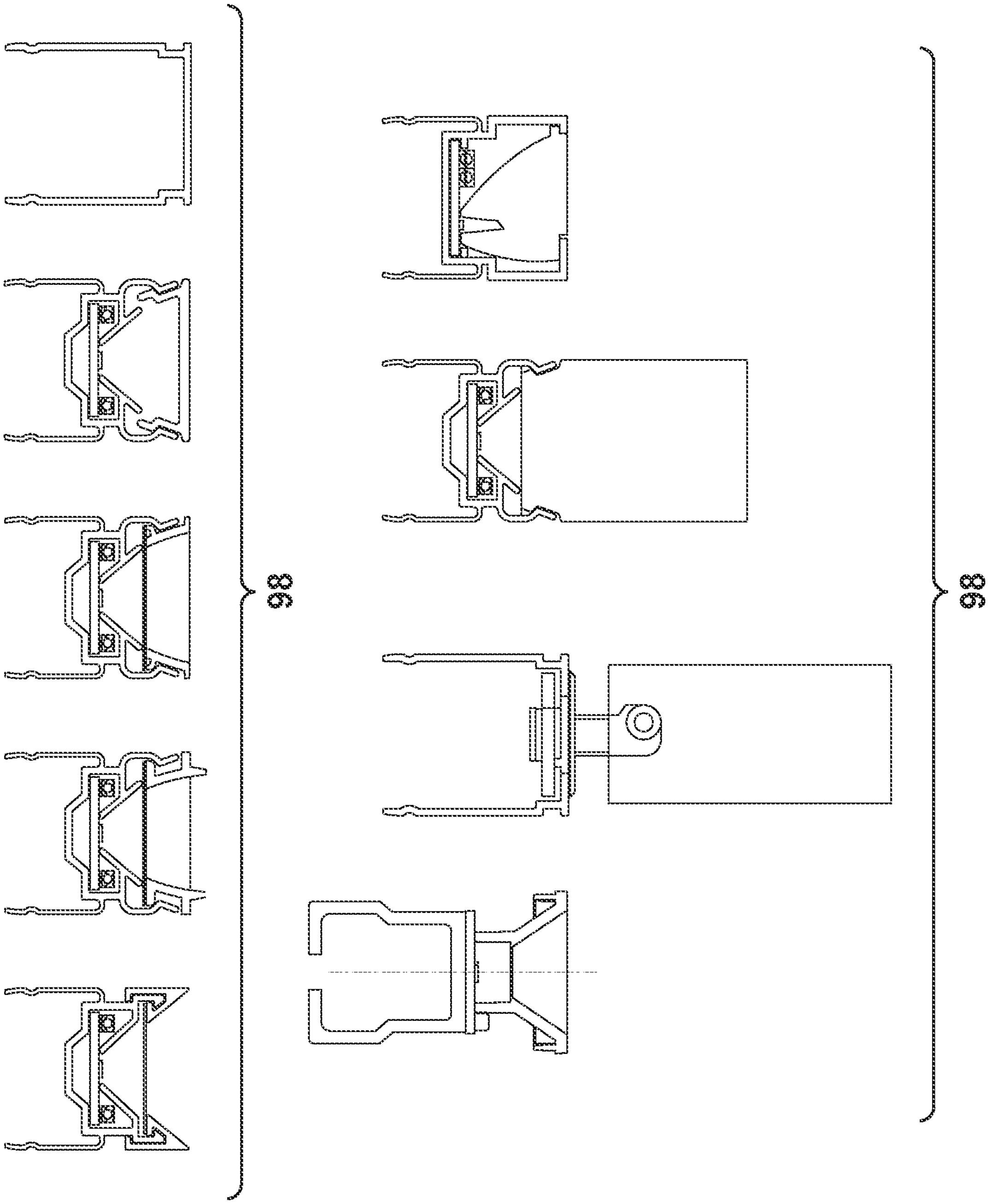

FIG. 6 shows example embodiments of a housing segment 60 secured to an anchor structure 96 such as any such structures disclosed and shown in U.S. Pat. App. No. 62/820,083 filed Mar. 18, 2019 and Ser. No. 16/723,665 filed Dec. 20, 2019, both entitled MOUNT INTERFACE FOR LIGHT FIXTURES, the entire subject matter of both of which is incorporated herein by reference. FIG. 7 shows example embodiments of lighting modules collectively at 98.

FIGS. 10 to 14 show another grid lighting network 100, having a first plurality of grid segments 102, each of which may be configured to be assembled to form the grid lighting network 100 and to define a second plurality of mounting sectors, with several such mounting sectors shown at 104. Each mounting sector 104 may be configured to operatively couple with a corresponding one of a third plurality of lighting modules 106.

At least one first power supply segment 110 may be provided which may be configured to be associated with the grid lighting network 100 and to be coupled to a first line voltage outlet as shown schematically at 112, via one of a plurality of stem structures 114, to deliver line voltage power to each of the mounting sectors 104 in at least one first power delivery zone generally shown at 118. In this case, the at least one first power delivery zone 118 may be defined by a designated first number of the second plurality of mounting sectors 104; and a designated first number of the third plurality of lighting modules 106.

Figure 12:
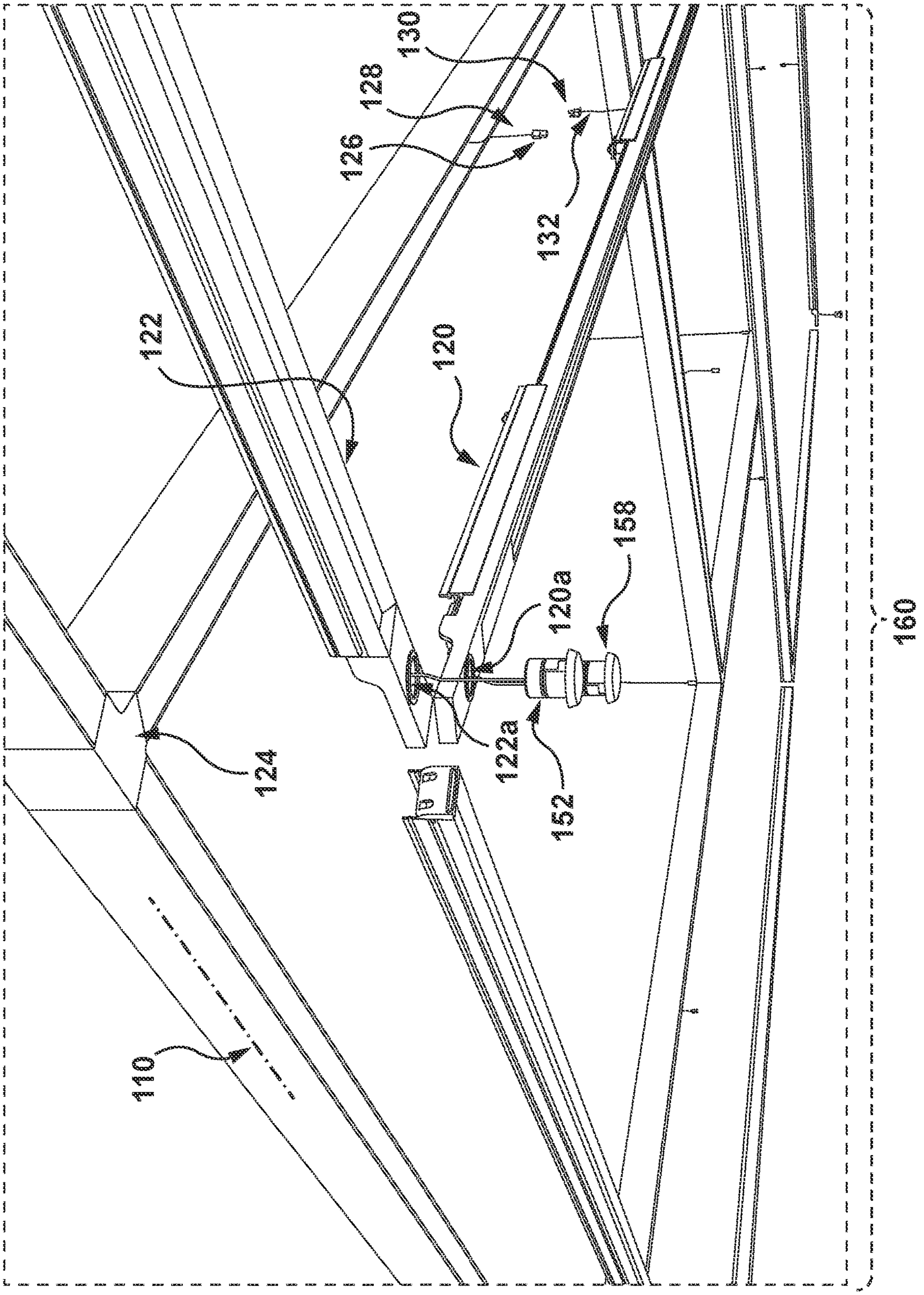

The at least one first power delivery zone 118 may be configured according to a first combined lighting unit power rating for the first power delivery zone 118 to approach, but not exceed, a maximum power delivery rating of the first line voltage outlet 112, to enable any one of the designated first number of lighting modules 106 to be moved from one of the mounting sectors 104 in the designated first number thereof to another of the mounting sectors 104 in the designated first number thereof, and still comply with the maximum power delivery rating of the first line voltage outlet 112. Referring to FIG. 12, the designated first number of lighting modules 106 may be selected from one or more track lighting modules 120 and/or one or more non-track lighting modules 122.

A plurality of hub segments 124, such as those disclosed in example embodiments in the present disclosure, may be provided to couple the first plurality of grid segments 102 together to form the grid lighting network 100. The hub segments 124 may be in the form of standardized or non-standard hub segments for interconnecting the grid segments 102.

In this case, the grid lighting network 100 may be formed from a kit which may be configured to include the first number of lighting modules 106, or be configured for the first number of lighting modules 106, or one or more thereof, to be supplied separately. The at least one first power supply segment 110 may include one or more line voltage outlet plugs 126 spaced along each mounting sector of the designated first number thereof.

Figure 11:
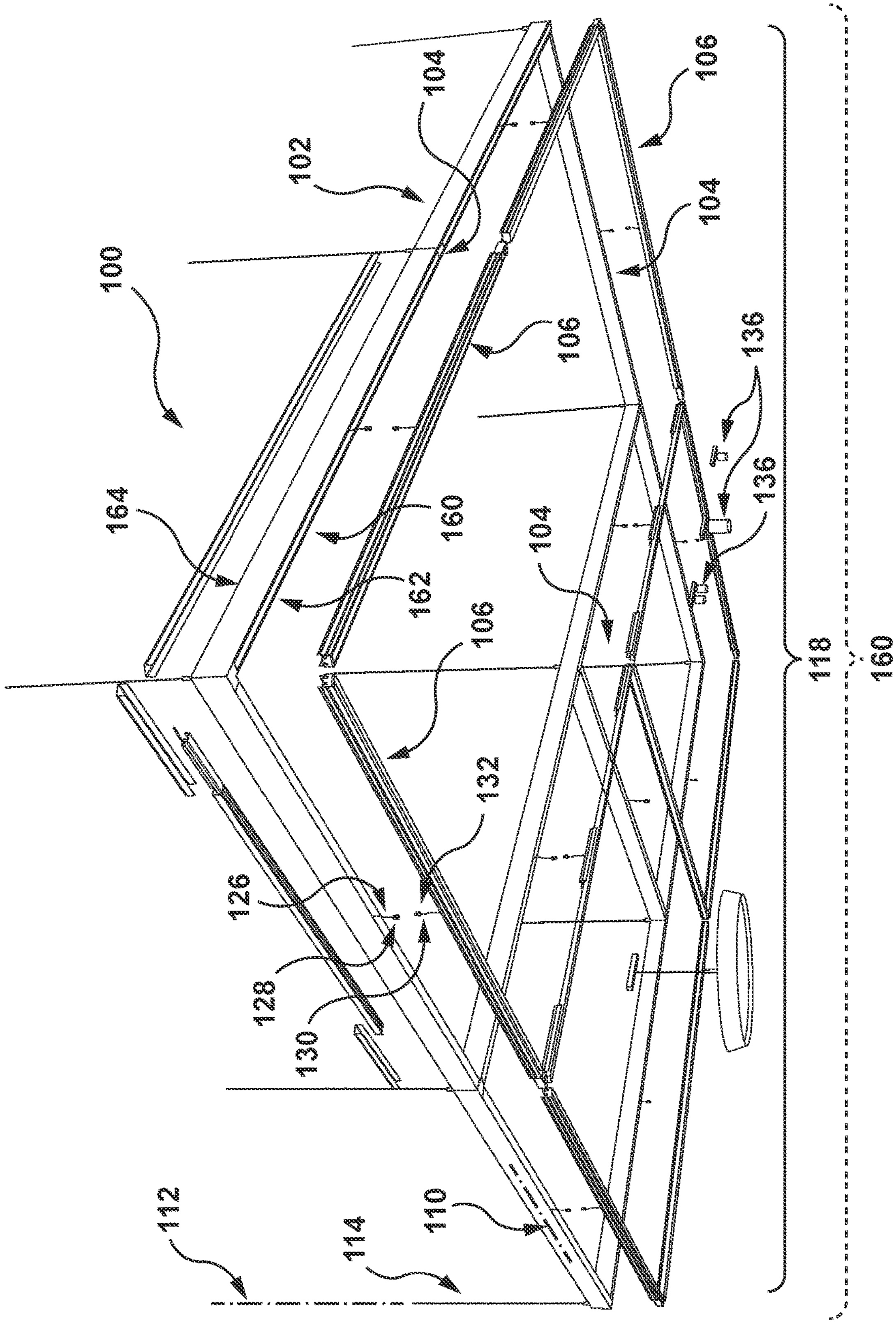
FIGS. 11 and 12 are part-assembly views of the grid lighting system network of FIG. 10.

Each of a group of one or more of the line voltage outlet plugs 126 may be mounted on a corresponding cable segment 128 to engage a complementary line voltage inlet plug 130 in the corresponding lighting module 106 on a corresponding cable segment 132. In this case, each track lighting module 120 of the designated first number of lighting modules 106 may be configured to receive one or more lighting submodules 136, three of which are shown in FIG. 11.

Figure 14:
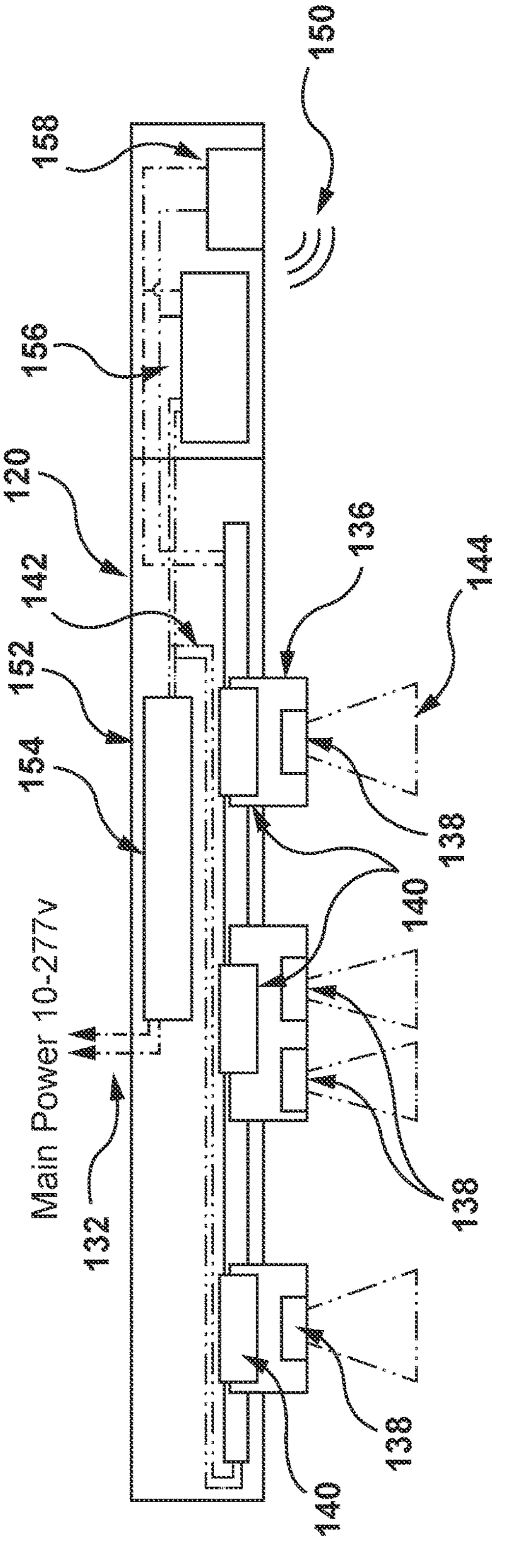

As schematically shown in FIG. 14, each lighting submodule 136 may include one or more arrays of one or more LEDs 138, and a submodule driver 140. Each track lighting module 120 may further comprise a second power supply segment 142 configured to deliver low voltage power to each of the submodule drivers 140, in which case the submodule driver 140 may be provided as a constant current Class 2 driver.

Figure 13:
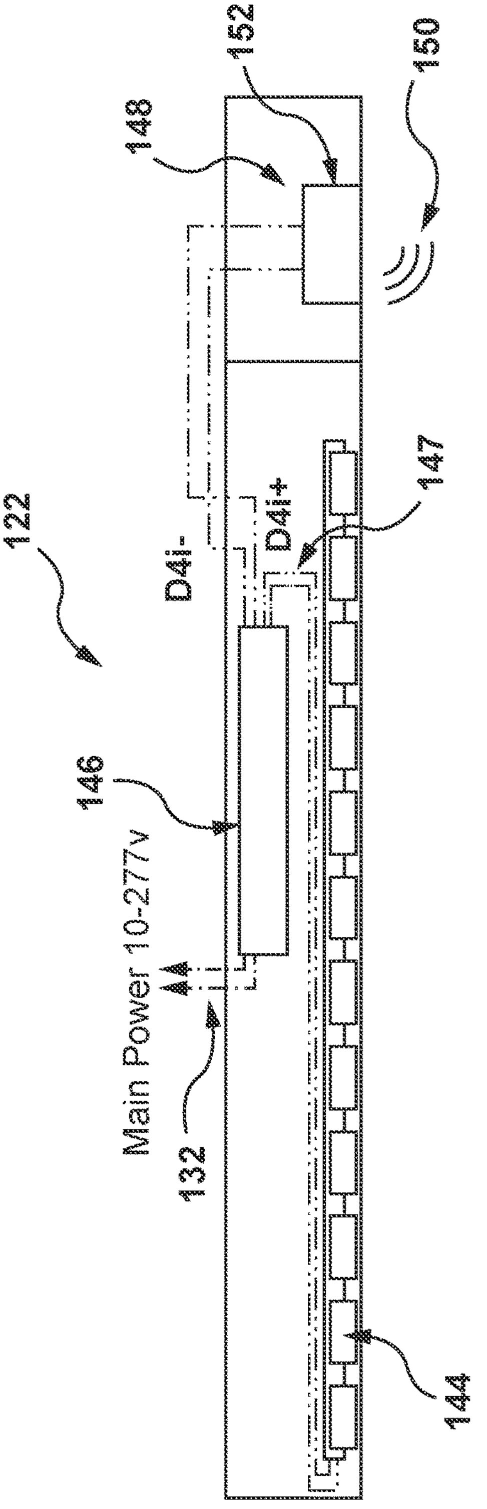
FIGS. 13 and 14 are schematic views of non-track and track lighting modules in the grid lighting system network of FIGS. 10 and 11.

Referring to FIG. 13, each non-track lighting module 122 may include one or more arrays of one or more LEDs 144, and a Class 2 driver 146 to deliver substantially constant current to the arrays of LEDs 144, via power supply segment 147.

Each non-track lighting module 122 may further comprise a first power controller segment 148 for controlling a first power level of output power to be delivered by the driver 146 to the one or more arrays of LEDs 144. The first power controller segment 148 may be configured to be addressable in a wired and/or wireless network, such as a wireless channel shown at 150 (or a wired channel such as may be provided via the cable segment 132), to receive commands to set the first power level by way of sensor segment 152. In this case, the sensor segment 152 may be integrally provided by the first power controller segment 148. As can be seen in FIG. 12, the non-track lighting module 122 may include a passage 122*a* to receive the first wireless sensor segment 152. The first power controller segment may be configured to communicate with the first wireless sensor segment to exchange signals on the wireless network.

Referring to FIG. 14, the second power supply segment 142 may further comprise a second power supply 154 and a second power controller segment 156 for controlling a second power level of output power to be delivered by the second power supply 154 to the one or more lighting submodules 136. The second power controller segment 156 may be configured to be addressable in a wired and/or wireless network, including the wireless channel 150 (or a wired channel such as may be provided via the cable segment 132), to receive commands to set the second power level, by way of sensor segment 158. As can be seen in FIG. 12, the track lighting module may include a passage 120*a* to receive the sensor segment 158.

Thus, in some example embodiments as shown in FIG. 11, a designated first number of one or more of the first plurality of grid segments 102 may be configured to provide at least one lighting zone 160, wherein the at least one lighting zone 160 may include at least one direct lighting zone 162 and/or an oppositely oriented indirect lighting zone 164.

The at least one first power supply segment 110 may be configured to receive the line voltage power at a voltage of from about 120 volts to about 277 volts at 60 watts (or at another level according to the one or more configurations or attributes of the grid lighting network 100 or components thereof), while the second power supply segment 142 may be configured to deliver the low voltage at a voltage of about 12 to about 48 volts at 60 watts (or at another level according to the one or more configurations or attributes of the grid lighting network 100 or components thereof).

The at least one first power supply segment 110 may further comprise a plurality of the first power supply segments 110, with each integrated into a corresponding grid segment 102, while each of the first power supply segments 110 may be configured to be electrically coupled with one or more adjacent first power supply segments 110 in the grid network 100 at a corresponding hub segment 124.

Figure 15:
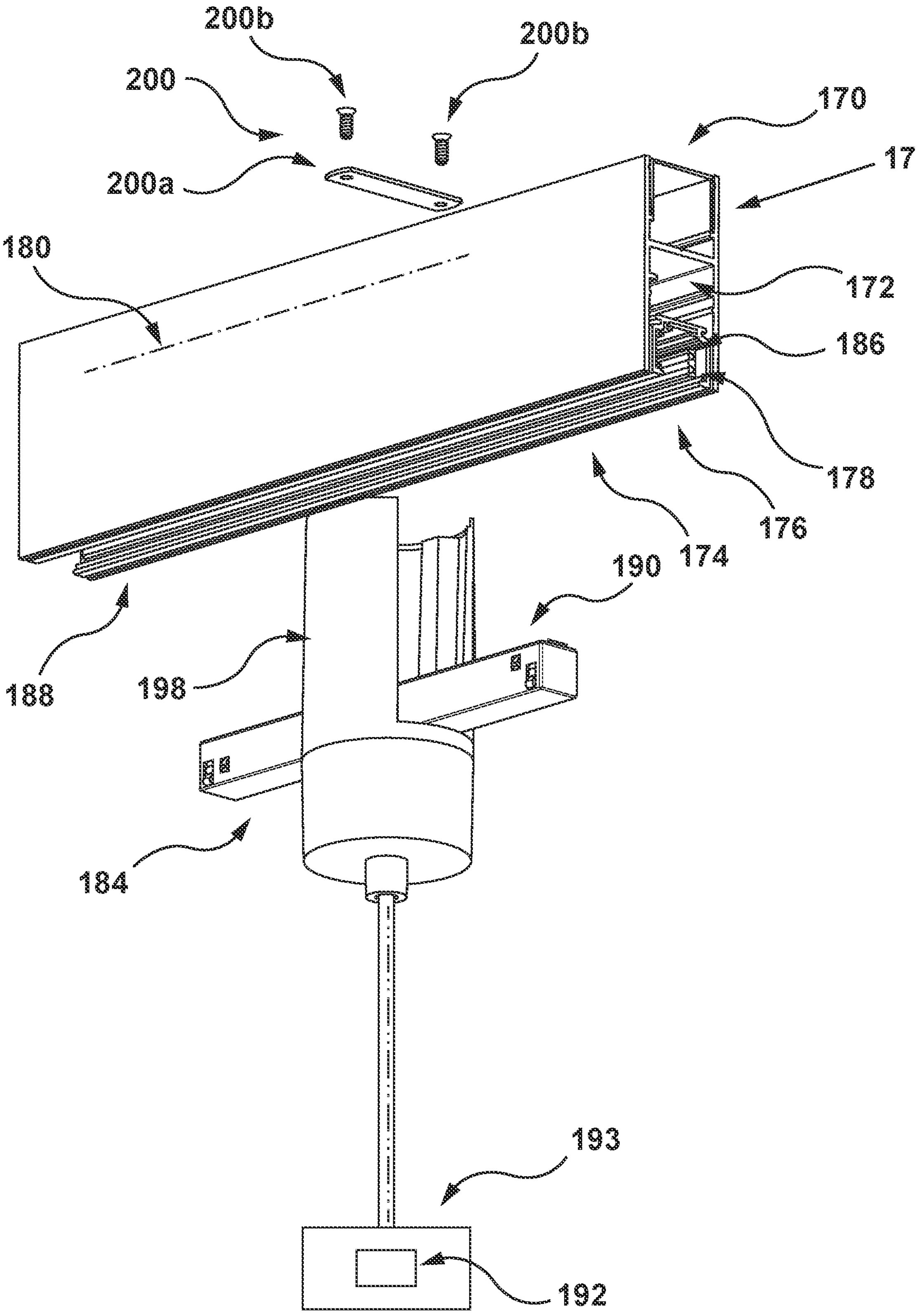
FIGS. 15 and 16 are perspective views of a track lighting module and a housing structure segment.

In some exemplary embodiments as shown in FIG. 15, one or more of the grid segments may include a housing structure segment 170, each which may define a first channel 174 to define at least one mounting sector 176, wherein the track lighting module 178 and/or non-track lighting module (not shown) are removably secured therein. In this case, a first power supply segment 180 may be associated with the housing structure segment 170 for delivering the line voltage power to the mounting sector 176.

The track lighting module 178 may include a second power supply segment (not shown) to receive the line voltage power and to deliver low voltage power to the at least one array of one or more LEDs, shown at 192.

In this case, the first and/or second power supply segments may be configured to be addressable in a wired and/or wireless network to receive operational commands for controlling the corresponding line voltage power to be delivered to the at least one track lighting module and/or at least one non-track lighting module, and/or the corresponding low voltage power to be delivered to the one or more arrays of one or more LEDs.

As can be seen in FIG. 15, the track lighting module 178 may be configured to be received in the first channel 174 in a configuration to receive the one or more lighting submodules 184. Each track lighting module 178 may include a track structure 186 defining a second channel 188, and each lighting submodule 184 may include a coupling structure 190 to be received by the track structure 186 in the second channel 188 in an operative position wherein the track structure 186 and the coupling structure 190 are configured to deliver the low voltage power to the lighting submodule 184.

Figure 18:
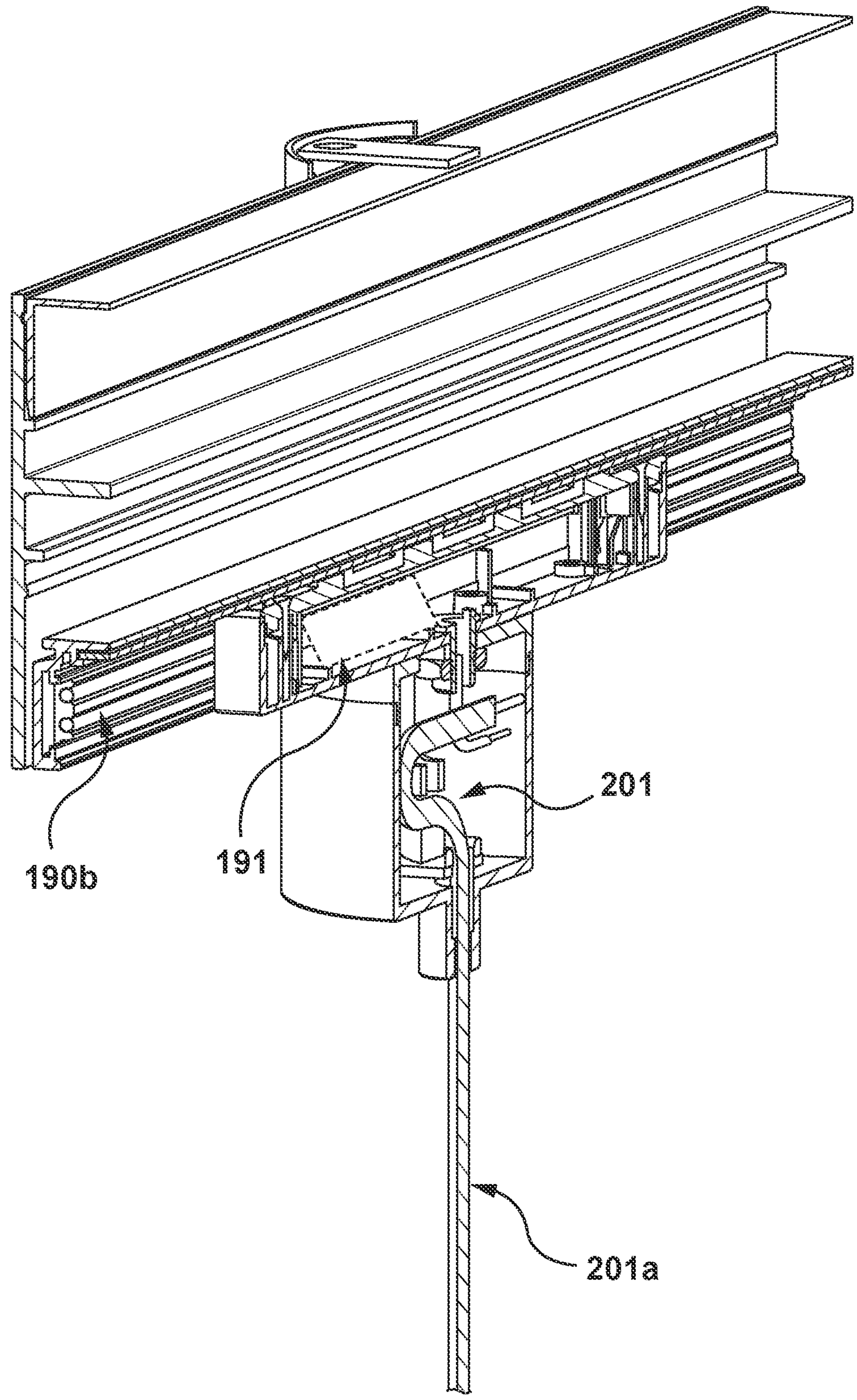
FIG. 18 is a sectional view taken on line 18-18 in FIG. 16.

The coupling structure 190 may include a power supply segment, which may include a constant current driver or a constant voltage power supply shown schematically at 191 in FIG. 18, to deliver a second low voltage power to the at least one array 192. Examples of the track structure 186 and coupling structure 190 may, for example, be commercially available at AAGSTUUCHI, as can be seen at https://www.aagstucchi.it/en/products/track-systems/., which may provide contacts 190*a* configured to engage exposed cables 190*b* to deliver lower voltage power, and in some cases wired communications commands to the lighting submodule.

Figure 16:
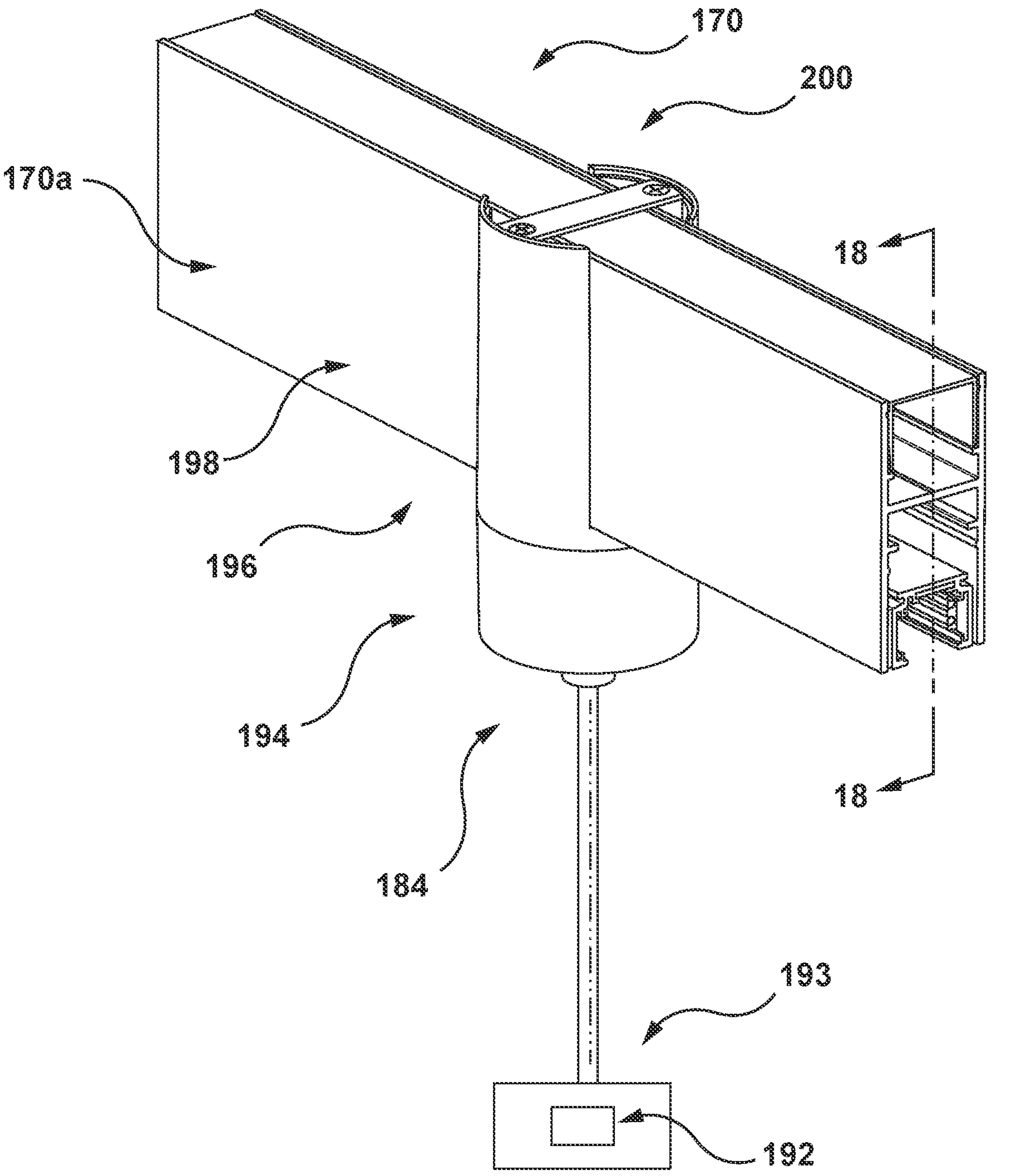
Figure 17:
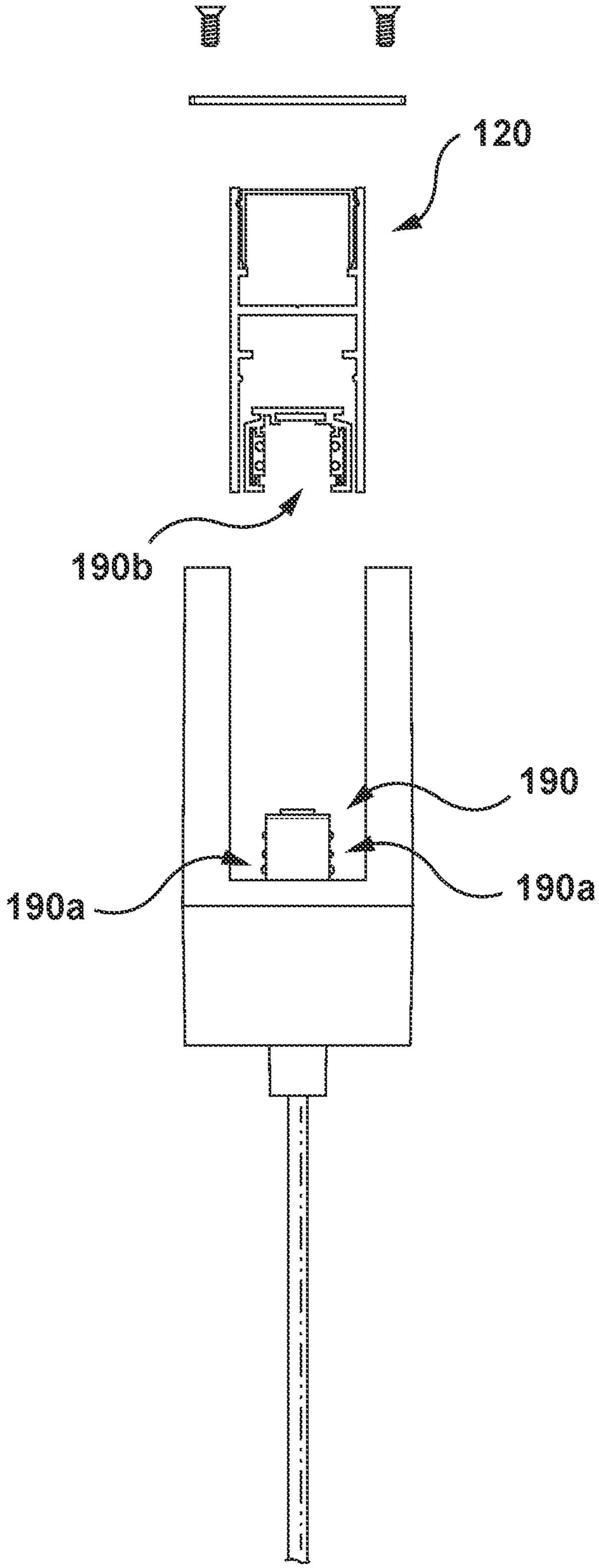
FIG. 17 is an end view taken on arrow 17 in FIG. 15.

Referring R to FIG. 16, the lighting submodule 184 may include bridging structure 194 to enable electrical connections between the coupling structure 190 and the at least one array 192, along with mounting structure 196 to releasably mount the lighting submodule 194 to the housing structure segment 170 with the coupling structure 190 in the operative position.

The mounting structure 196 may include at least one arm 198, configured to extend along a corresponding boundary 170*a* of the housing structure 170 and a retaining structure to releasably engage the arm 198 and the housing structure segment 170. In the example embodiment of FIG. 16, the mounting structure 196 may include a pair of arms 198 configured to extend along opposite boundaries 170*a* of the housing structure segment 170, and the retaining structure 200 may be configured to releasably engage at least one of the arms 198 and the housing structure segment 170. The retaining structure may include a retaining plate 200*a* removably secured to the arms 198 by way of fasteners 200*b* extending into correspondingly aligned passages in the retaining plate 200*a* and the arms 198. The bridging structure may also be associated with an anchoring structure 201 providing a cable 210*a* to anchor and/or support at least one pendant or non-pendant light fixture 193 supporting the at least one array 193.

Figure 19:
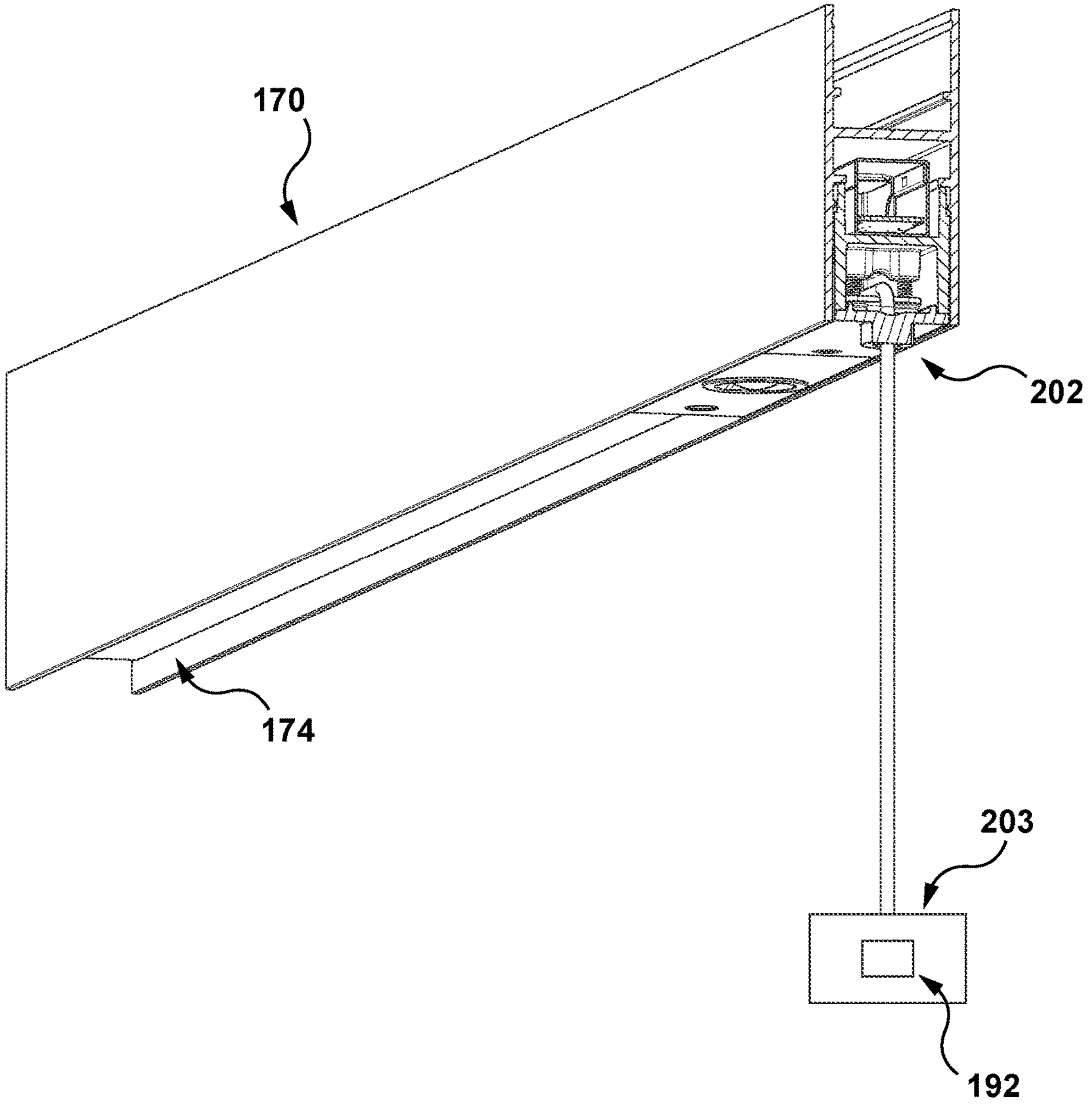
FIGS. 19 and 20 are perspective views of a non-track lighting module and a housing structure segment.
Figure 20:
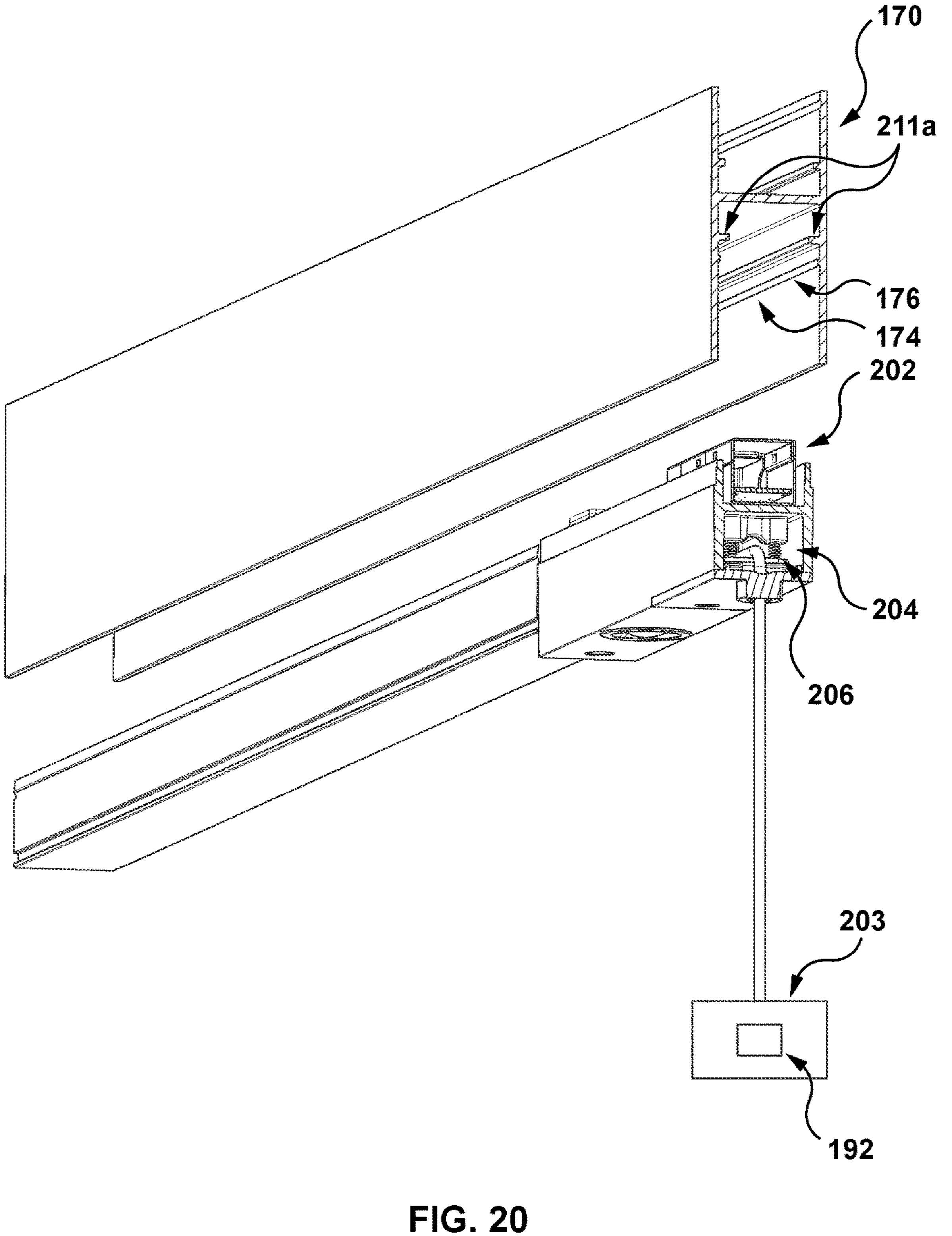

Referring to FIG. 19, the non-track lighting module 202 may be configured to be received in the first channel 174 in a configuration to anchor at least one pendant or non-pendant light fixture thereto, shown schematically at 203 containing at least one of the one or more arrays 192.

The non-track lighting module 202 may include a coupling structure 204 to be received in the first channel 174 and configured to receive the line voltage power from the mounting sector 176 and to deliver the low voltage power to the at least one pendant or non-pendant light fixture 203 thereto, containing the at least one array 192. A bridging structure 204 such as shown at 206 may enable electrical connections between the coupling structure 204 and the at least one pendant or non-pendant light fixture.

As may apply to the track lighting module 178, the non-track lighting module 202 may include one or more releasable locking structures 208 to removably lock the non-track lighting module 202 in the first channel 174. The one or more releasable locking structures 208 may include one or more latches 210 movable between a released position (shown longitudinally oriented in FIG. 21) and a locking position (in which they transversely oriented as shown in dashed lines), wherein in the locking position the one or more latches engage a complementary stop segment, in this case a pair of opposed stop segments 211, associated with the housing segment adjacent the first channel.

Figure 21:
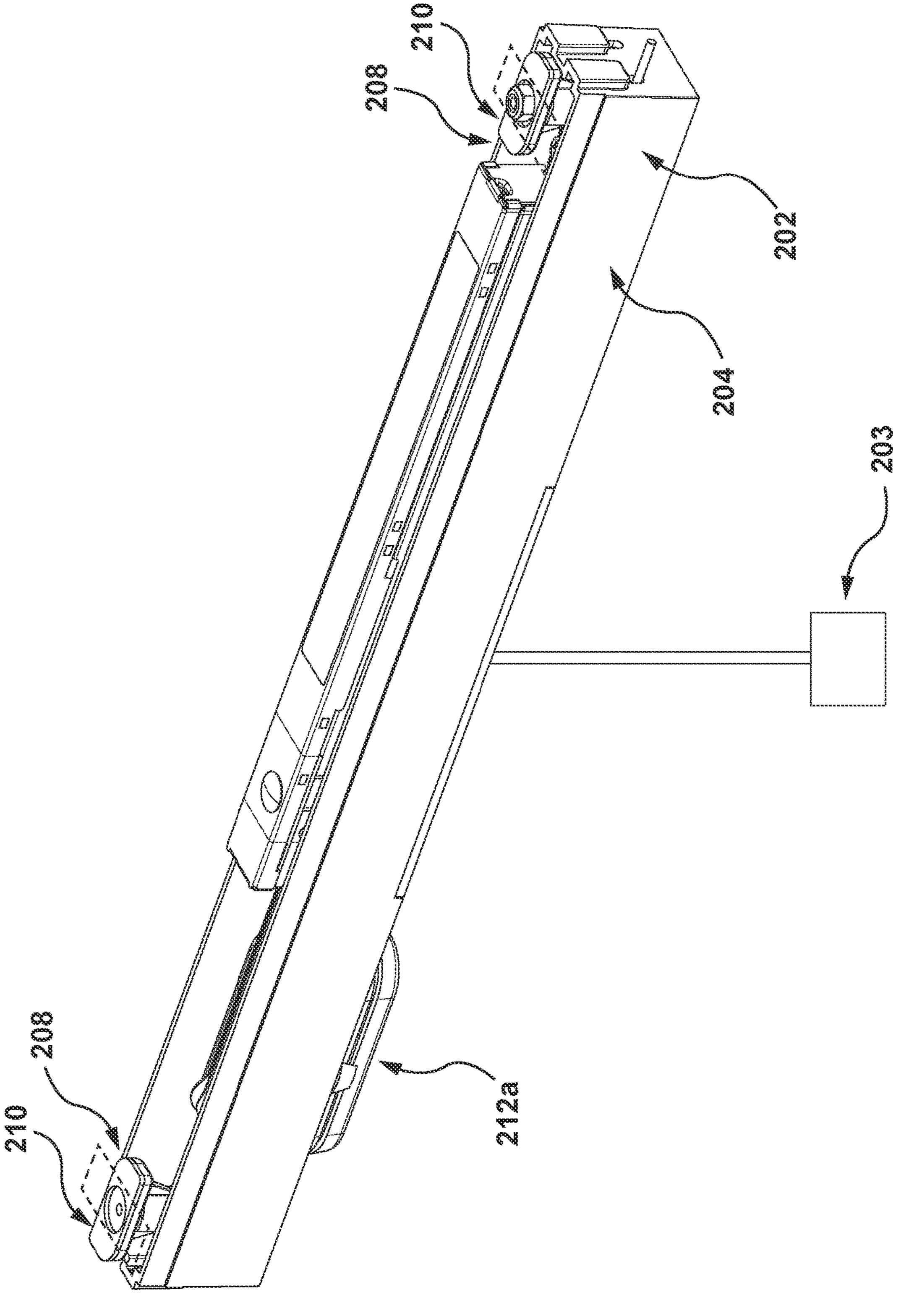
FIGS. 21 and 22 are perspective views of the non-track lighting module of FIGS. 19 and 20.
Figure 22:
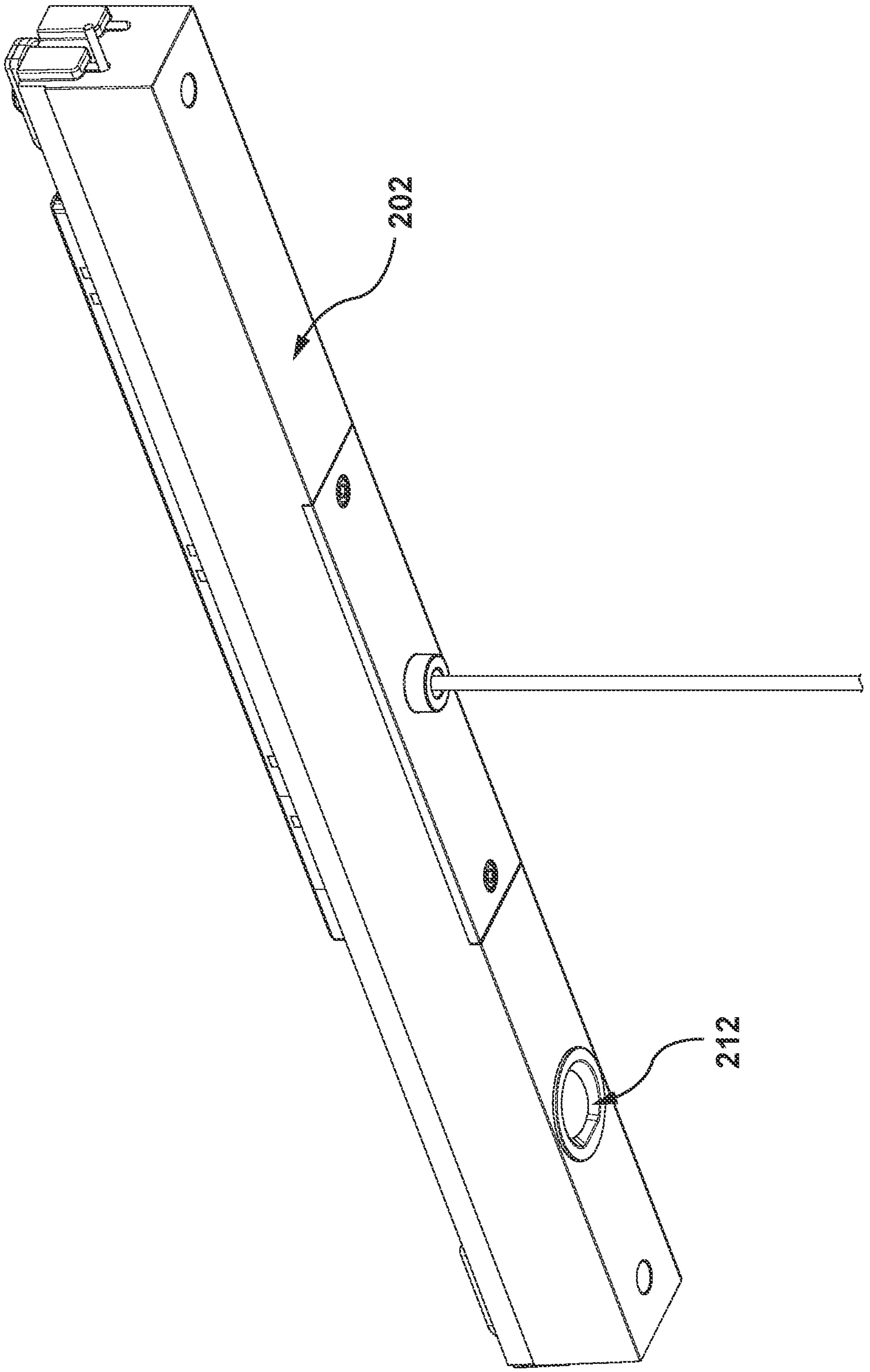

As can be seen in FIG. 22, the non-track lighting module 202 may be provided with a sensor segment 212 (and a cover 212*a* as seen in protective cover as shown in FIG. 21) to be addressable in a wired and/or wireless network to receive operational commands for controlling the lower voltage power to be delivered to the one or more arrays of one or more LEDs.

While the present disclosure describes various example embodiments, the disclosure is not so limited. To the contrary, the disclosure is intended to cover various modifications and equivalent arrangements, as will be readily appreciated by the person of ordinary skill in the art.

The invention claimed is:

1. A lighting system comprising at least one grid network configured to provide one or more mounting sectors therein and to deliver line voltage power thereto from a single line voltage power source, each of the one or more mounting sectors configured to receive one or more track lighting module modules and/or one or more non-track lighting modules for delivery of light to an interior space adjacent the at least one grid network, each of the one or more one track lighting modules and/or one or more non-track lighting modules being operatively associated with one or more arrays of one or more LEDs, and each of the one or more track lighting modules and/or one or more non-track lighting modules being configured to receive the line voltage power from the at least one grid network and to deliver low voltage power to the one or more arrays of one or more LEDs associated therewith, wherein each of the one or more track lighting modules is configured to receive one or more lighting submodules, each lighting submodule including at least one of the one or more arrays of one or more LEDs, and a submodule driver, and wherein each track lighting module further comprises a power supply segment configured to deliver the low voltage power to the submodule driver to power the at least one of the one or more arrays of one or more LEDs.

2. The lighting system as defined in claim 1, wherein each of the at least one grid network further comprises a plurality of standardized grid segments which are configured for assembly in any one of a plurality of grid network configurations, such that any one of the track lighting modules and/or any one of the non-track lighting modules is engageable with any one of the mounting sectors.

3. The lighting system as defined in claim 2, wherein each of the at least one grid network further comprises a plurality of standardized hub segments for interconnecting the plurality the standardized grid segments.

4. The lighting system as defined in claim 2, wherein at least one of the one or more of the grid segments includes a housing segment structure, defining a first channel to define one or more mounting sectors, wherein the each of the one or more track lighting modules and/or each of the one or more non-track lighting modules is removably secured therein.

5. The lighting system as defined in claim 4, further comprising a first power supply segment associated with the housing structure for delivering the line voltage power to the one or more mounting sectors, and wherein each of the one or more track lighting modules and/or each of the one or more non-track lighting modules includes a second power supply segment to receive the line voltage power and to deliver low voltage power to the one or more arrays.

6. The lighting system as defined in claim 5, wherein each of the one or more track lighting modules includes a track structure defining a second channel, and each of the one or more lighting submodules includes a coupling structure to be received by the track structure in the second channel in an operative position, and wherein the track structure and the coupling structure are configured to deliver the low voltage power to each of the one or more lighting submodules.

7. The lighting system as defined in claim 6, wherein the coupling structure includes a second power supply segment to deliver a second low voltage power to the one or more arrays.

8. The lighting system as defined in claim 6, further comprising bridging structure to enable electrical connections between the at least one grid network and the one or more arrays.

9. The lighting system as defined in claim 4, wherein each of one or more one track lighting module and/or each of the one or more non-track lighting module includes one or more releasable locking structures to removably lock the corresponding track lighting module and/or non-track lighting modules in the first channel.

10. The lighting system as defined in claim 4, wherein the track lighting module is configured to be received in the first channel in a configuration to receive the one or more lighting submodules.

11. The lighting system as defined in claim 4, wherein each of the one or more non-track lighting modules is configured to be received in the first channel in a configuration to anchor at least one pendant or non-pendant light fixture thereto containing at least one of the one or more arrays.

12. A lighting system, comprising:

a plurality of lighting modules;

at least one grid lighting network to provide one or more mounting sectors therein, with each mounting sector configured to operatively couple with a corresponding one or more of the plurality of lighting modules, the at least one grid lighting network configured to deliver line voltage power from a single line voltage outlet to the one or more mounting sectors in at least one first power delivery zone in the at least one grid lighting network wherein the at least one first power delivery zone is configured according to a first combined lighting unit power rating for the first power delivery zone to approach but not exceed a maximum power delivery rating of the line voltage outlet;

wherein one or more lighting modules are selected from one or more track lighting modules and/or one or more non-track lighting modules; and wherein each of the one or more track lighting modules is configured to receive one or more lighting submodules, wherein each of the one or more lighting submodules includes one or more arrays of one or more LEDs, and a submodule driver, and wherein each track lighting module is configured to deliver low voltage power to the submodule driver.

13. The lighting system as defined in claim 12, wherein the at least one grid lighting network includes a plurality of grid segments.

14. The lighting system as defined in claim 13, further comprising a plurality of hub structures to couple the plurality of grid segments together to form the grid lighting network.

15. A hub structure as defined in claim 14.

16. The lighting system as defined in claim 13, further comprising one or more first power supply segments, each including one or more line voltage outlet plugs spaced along the one or more mounting sectors.

17. The lighting system as defined in claim 16, wherein each of a group of one or more of the line voltage outlet plugs is mounted on a corresponding cable segment to engage a complementary line voltage inlet plug in the corresponding lighting module.

18. The lighting system as defined in claim 16, wherein the at least one first power supply segment is configured to receive the line voltage power at a voltage of from about 120 volts to about 277 volts at 60 watts.

19. The lighting system as defined in claim 16, wherein the one or more first power supply segments comprises a plurality of first power supply segments, with each thereof integrated into a corresponding grid segment, with each of the first power supply segments is configured to be electrically coupled with one or more adjacent first power supply segments in the grid network at a corresponding hub structure.

20. The lighting system as defined in claim 13, wherein one or more of the plurality of grid segments is configured to provide at least one lighting zone, wherein the at least lighting zone includes at least one direct lighting zone and/or an indirect lighting zone.

21. A grid segment as defined in claim 13.

22. The lighting system as defined in claim 12, wherein the submodule driver is a class 2 driver.

23. The lighting system as defined in claim 12, wherein each of the one or more non-track lighting modules includes one or more arrays of one or more LEDs, and a constant current driver to deliver substantially constant current thereto.

24. The lighting system as defined in claim 23, wherein each of the one or more non-track lighting modules further comprises a first power controller segment for controlling a first power level of output power to be delivered by the constant current driver to the one or more arrays of one or more LEDs.

25. The lighting system as defined in claim 24, wherein the first power controller segment is configured to be addressable in a wired and/or wireless network to receive commands to set the first power level.

26. The lighting system as defined in claim 12, wherein the second power supply segment further comprises a second power supply and a second power controller segment for controlling a second power level of output power to be delivered by the second power supply to the one or more lighting submodules.

27. The lighting system as defined in claim 12, wherein each of the one or more track lighting modules further comprises a second power supply segment is configured to deliver the low voltage at a voltage of from about 12 to about 48 volts at 60 watts.

28. A lighting module as defined in claim 12.

* * * * *